United States Patent
Liu et al.

(10) Patent No.: US 12,321,312 B2
(45) Date of Patent: Jun. 3, 2025

(54) DISTRIBUTED STORAGE SYSTEM, METHOD, DEVICE, AND STORAGE MEDIUM FOR METADATA MANAGEMENT

(71) Applicant: Alibaba (China) Co., Ltd., Hangzhou (CN)

(72) Inventors: Junfeng Liu, Zhejiang (CN); Wenhui Yao, Beijing (CN); Xiaodong Wang, Zhejiang (CN); Chenyi You, Zhejiang (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 162 days.

(21) Appl. No.: 18/346,471

(22) Filed: Jul. 3, 2023

(65) Prior Publication Data

US 2024/0020267 A1    Jan. 18, 2024

(30) Foreign Application Priority Data

Jul. 13, 2022   (CN) .......................... 202210828426.0

(51) Int. Cl.
*G06F 16/10*    (2019.01)
*G06F 16/11*    (2019.01)
(Continued)

(52) U.S. Cl.
CPC .......... *G06F 16/122* (2019.01); *G06F 16/182* (2019.01); *G06F 16/235* (2019.01); *G06F 16/2365* (2019.01)

(58) Field of Classification Search
CPC .... G06F 16/122; G06F 16/182; G06F 16/235; G06F 16/2365
See application file for complete search history.

(56) References Cited

U.S. PATENT DOCUMENTS

| 6,240,416 B1 * | 5/2001 | Immon | G06F 16/27 |
| 2016/0321295 A1 * | 11/2016 | Dalton | G06F 16/14 |

(Continued)

FOREIGN PATENT DOCUMENTS

| CN | 103631820 A | * | 3/2014 | ......... G06F 17/3012 |
| CN | 106599308 A | * | 4/2017 | ........... G06F 16/164 |

(Continued)

OTHER PUBLICATIONS

Article entitled "The Technical Practice of Distributed Locks in a Storage System", by KingJames, dated Jan. 12, 2021 (Year: 2021).*

*Primary Examiner* — Mahesh H Dwivedi
(74) *Attorney, Agent, or Firm* — Finnegan, Henderson, Farabow, Garrett & Dunner, LLP

(57) ABSTRACT

A system for distributed storage includes a distributed file system for distributed storage of data, distributed metadata service nodes configured to run in different processes and configured to manage metadata of the data, in which the distributed metadata service nodes are configured with corresponding condition files, control nodes configured to compete for a permission to update the condition file to become a master control node, and obtain an operation permission on the data as the master control. The master control node is configured to utilize the operation on the data to control consistency of the condition files of the distributed metadata service nodes.

20 Claims, 7 Drawing Sheets

(51) Int. Cl.
*G06F 16/182* (2019.01)
*G06F 16/23* (2019.01)

(56) References Cited

U.S. PATENT DOCUMENTS

2021/0279151 A1* 9/2021 Sarkar ................. G06F 11/1469
2021/0389883 A1* 12/2021 Derryberry ......... G06F 11/2094

FOREIGN PATENT DOCUMENTS

| CN | 106815254 | A | * | 6/2017 | ............. | G06F 16/00 |
| CN | 111597148 | A | * | 8/2020 | ............. | G06F 16/13 |
| CN | 112749136 | A | * | 5/2021 | ........... | G06F 16/137 |
| CN | 112860276 | A | * | 5/2021 | ........... | G06F 16/182 |

* cited by examiner

Acquire an operation permission for data in a distributed file system by competing with other control nodes for a permission to update condition files configured for distributed metadata service nodes —701

Utilize an operation on the data to control the condition files of the distributed metadata service nodes to be updated consistently —702

FIG. 7

Acquire an operation request for data in a distributed file system provided by a master control node —801

Update, in response to the operation request, condition files of distributed metadata service nodes consistently —802

FIG. 8

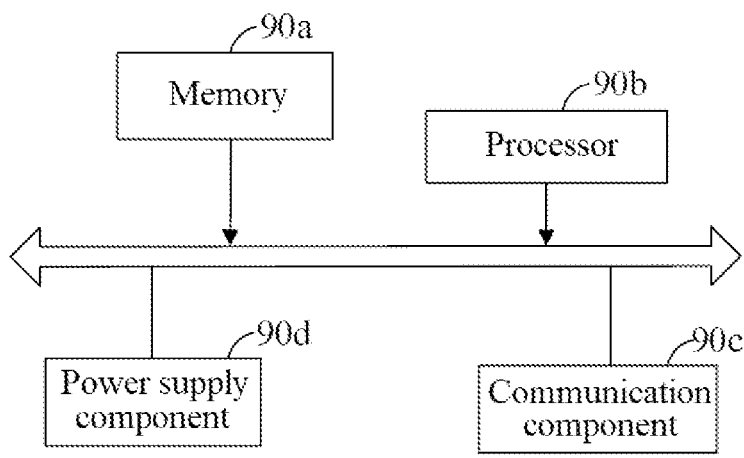

FIG. 9

DISTRIBUTED STORAGE SYSTEM, METHOD, DEVICE, AND STORAGE MEDIUM FOR METADATA MANAGEMENT

CROSS-REFERENCE TO RELATED APPLICATIONS

The present application claims priority to and the benefits of Chinese Patent Application No. 202210828426.0, filed on Jul. 13, 2022, which is incorporated herein by reference in its entirety.

TECHNICAL FIELD

The present disclosure relates to the field of data storage technologies, and in particular, to a distributed storage system, a method, a device, and a storage medium for metadata management.

BACKGROUND

In recent years, with the development of information technologies, more and more information has been digitized, and the data is growing explosively. Distributed file storage can improve the effectiveness of data storage and management. For most distributed file storage systems, metadata and file data are usually separated, that is, a control flow and a data flow are separated, so as to obtain higher policy scalability and I/O concurrency. Therefore, a metadata management model is very important, which directly affects the scalability, performance, reliability, stability, and the like of the policy.

Existing metadata management methods can be classified into a centralized metadata management method and a distributed metadata management method. In the centralized metadata service method, various metadata service nodes are located within a process, and a central metadata server is provided to be responsible for metadata storage and client query requests. It provides a unified namespace and handles access control functions such as address resolution and data positioning. In the distributed metadata service method, various metadata service nodes correspond to independent processes, for managing metadata in different dimensions. However, the distributed metadata service method has a problem of metadata inconsistency.

SUMMARY

Embodiments of the present disclosure provide a system for distributed storage. For example, the system includes a distributed file system for distributed storage of data, distributed metadata service nodes configured to run in different processes and configured to manage metadata of the data, in which the distributed metadata service nodes are configured with corresponding condition files, and control nodes configured to compete for a permission to update the condition file to become a master control node, and obtain an operation permission on the data as the master control node. The master control node is configured to utilize the operation on the data to control consistency of the condition files of the distributed metadata service nodes.

Embodiments of the present disclosure provide a method for metadata management. For example, the method includes acquiring an operation permission on data in a distributed file system by competing with other control nodes for a permission to update condition files configured in distributed metadata service nodes, and controlling, by an operation on the data, the condition files of the distributed metadata service nodes to be updated to be may include with each other.

Embodiments of the present disclosure provide a method for metadata management. For example, the method includes acquiring an operation request for data in a distributed file system provided by a master control node, and updating, in response to the operation request, condition files of the distributed metadata service nodes to be may include with each other.

Other embodiments of the present disclosure provide corresponding computing devices and non-transitory computer-readable storage medium. For example, the computing device includes a memory for storing a computer program, a communication component, and one or more processors coupled to the memory and the communication component and configured to execute the computer program to perform operations of the above methods. For example, the non-transitory computer-readable storage medium stores computer instructions that are executable by one or more processors of a device to cause the device to perform operations of the above methods.

BRIEF DESCRIPTION OF THE DRAWINGS

The accompanying drawings described herein are used to provide further understanding of the present disclosure, and construct a part of the present disclosure. Exemplary embodiments and illustrations of the present disclosure are used to explain the present disclosure, and not intended to constitute improper limitation on the present disclosure.

FIG. 7 and FIG. 8 are schematic flowcharts of a method for metadata management, according to some embodiments of the present disclosure.

FIG. 9 is a schematic structural diagram of a computing device, according to some embodiments of the present disclosure.

DETAILED DESCRIPTION

In order to facilitate a better understanding of the objectives, technical solutions and advantages of the present disclosure, technical solutions of the present disclosure are clearly and completely described through specific embodiments of the present disclosure and corresponding accompanying drawings. It should be apparent that, the described embodiments are only some embodiments of the present disclosure, and not all embodiments. Based on the embodiments of the present disclosure, all other embodiments that can be derived by a person of ordinary skill in the art without any creative effort shall all fall within the protection scope of the present disclosure.

In the embodiments of the present disclosure, in a distributed metadata service application scenario, a distributed metadata service node is configured with a condition file, and a control node acquires an operation permission on data in a distributed file system by competing for a permission to update the condition file. By utilizing a master control node with the operation permission on the data to operate data in the distributed file system, consistency of condition files among distributed metadata service nodes can be achieved, which can enable the master control node to successfully operate the data and improve the performance of the distributed file system.

Figure 1:
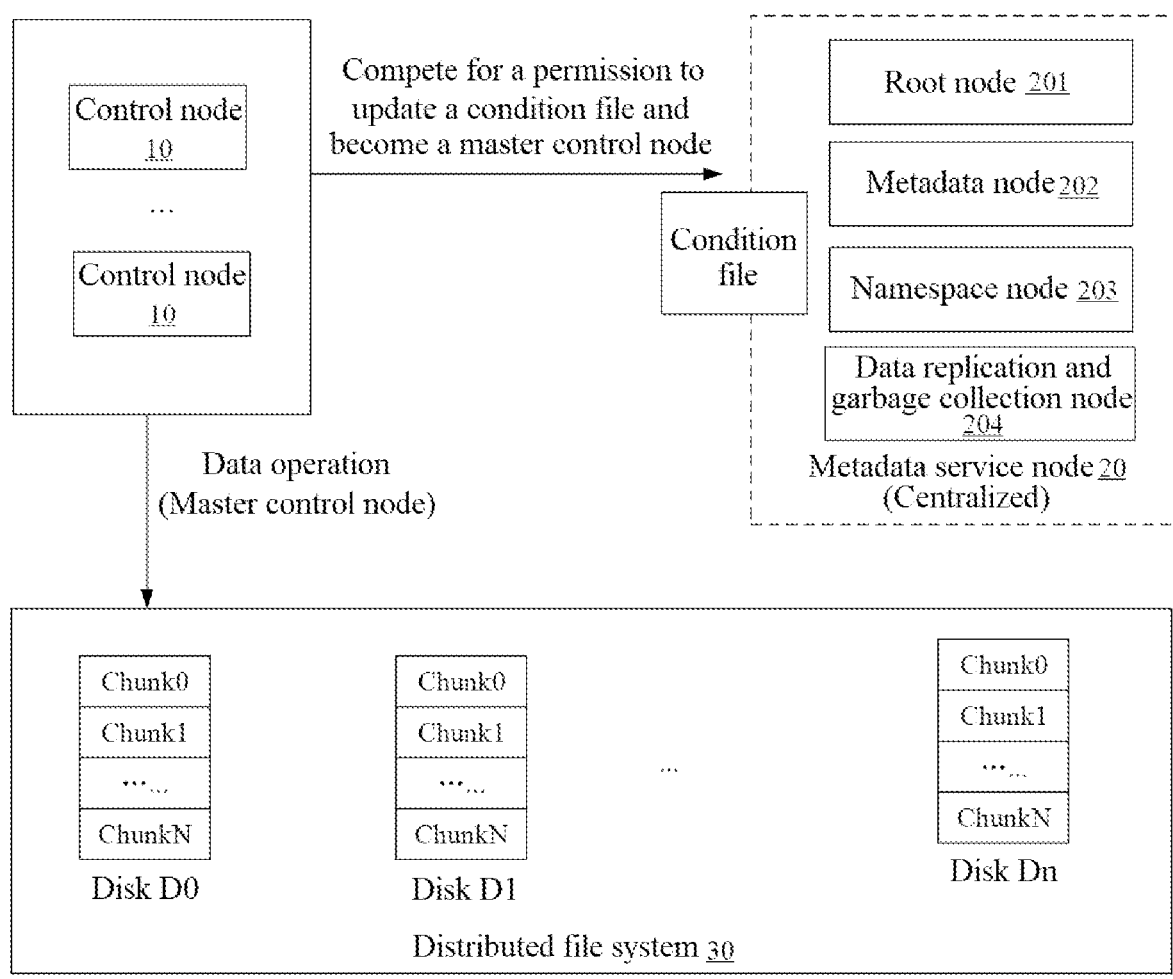
FIG. 1 and FIG. 2 are schematic structural diagrams of a distributed storage system, according to some embodiments of the present disclosure.
Figure 2:
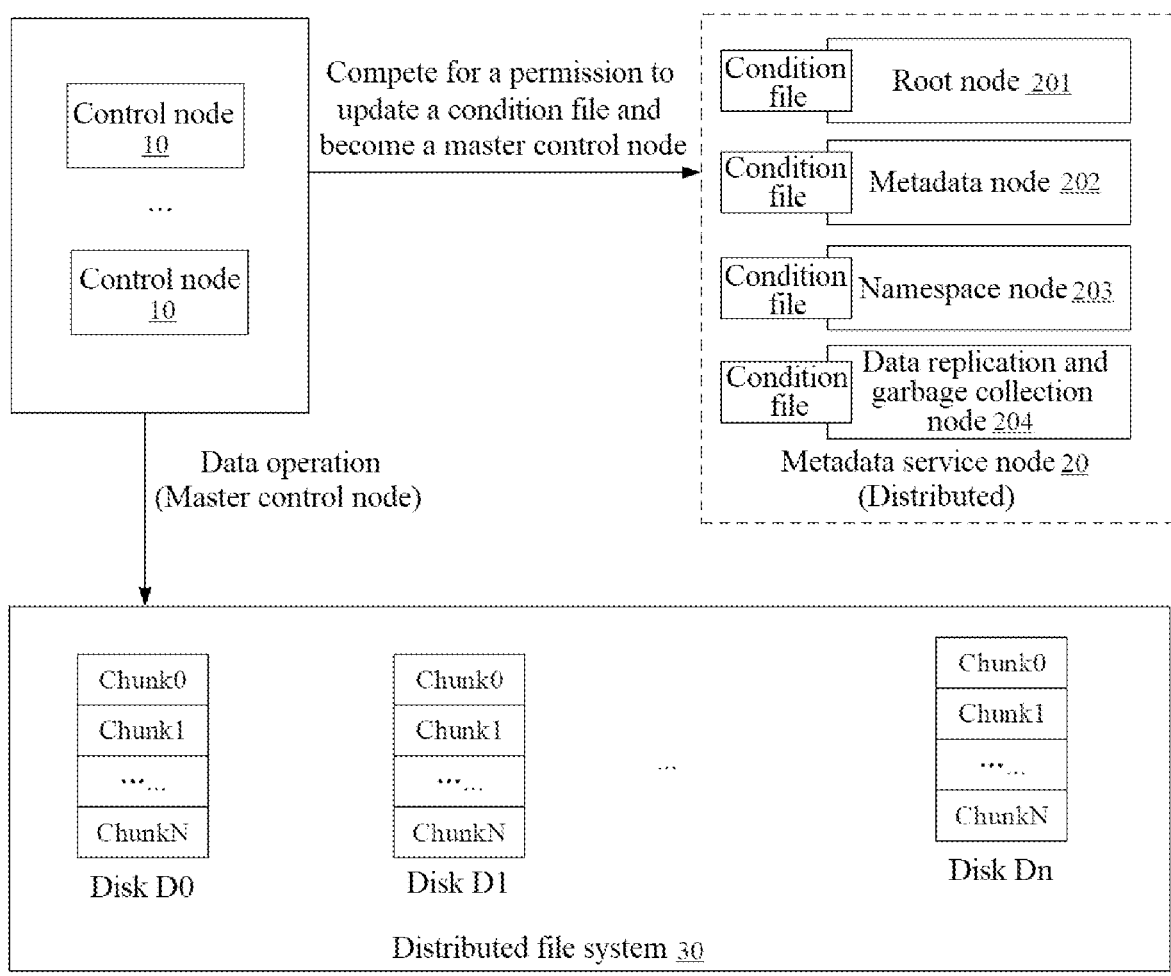

FIG. 1 and FIG. 2 are schematic structural diagrams of a distributed storage system, according to some embodiments of the present disclosure. As shown in FIG. 1, the system mainly includes control nodes 10, metadata service nodes 20, and a distributed file system 30.

The distributed file system 30 can be used for distributed storage of data. The data can be file data, image data, data tables, or the like. The distributed file system 30 can implement distributed storage of data based on a block storage service. For example, as shown in FIG. 1 and FIG. 2, data in the distributed file system is distributed and stored in chunks on different disks (such as disks D0-Dn). For most distributed file storage systems, metadata and data are usually separated, that is, a control flow and a data flow are separated, so as to obtain higher policy scalability and I/O concurrency. Therefore, a metadata management model is critical.

The metadata service node is configured to manage metadata of data. The metadata service node can include multiple metadata service nodes 20. The term "multiple" refers to 2 or more than 2. The metadata service nodes 20 are configured to manage metadata in different dimensions. In some embodiments, the metadata service nodes can include a root node (e.g., a Root Server) 201, a metadata node (e.g., a Meta Server) 202, a namespace node (e.g., a Namespace Server) 203, and a data replication and garbage collection node (e.g., an RG Server) 204.

The root node 201 is responsible for scheduling and controlling all nodes in a cluster in the distributed file system. The metadata node 202 is responsible for managing identifier (INode) information of files in the distributed file system and is responsible for data security, and can be a holder of a file session lock. The namespace node 203 is responsible for managing a directory tree of a file system in the distributed file system. The data replication and garbage collection node 204 is responsible for data replication and garbage collection in the distributed file system.

The metadata management modes can be classified into a centralized metadata management mode (as shown in FIG. 1) and a distributed metadata management mode (as shown in FIG. 2). As shown in FIG. 1, the centralized metadata service refers to that the metadata service nodes mentioned above (e.g., the root node 201, the metadata node 202, the namespace node 203, and the data replication and garbage collection node 204) are located within a process, collectively referred to as metadata service nodes.

As shown in FIG. 2, the distributed metadata service refers to that the metadata service nodes mentioned above (e.g., the root node 201, the metadata node 202, the namespace node 203, and the data replication and garbage collection node 204) run in different independent processes respectively. Different metadata service nodes can interact with each other through remote procedure call (RPC). For the metadata service nodes in the distributed metadata service, they can be referred to as distributed metadata service nodes. The distributed metadata service nodes run on different independent processes, for managing metadata in different dimensions of data in the distributed file system.

For block storage services, master and slave services are often used to improve the service stability. That is, multiple control nodes (Masters) 10 are used to provide block storage services to each other as master and slave nodes. The term "multiple" refers to 2 or more than 2. The control node 10 can also be referred to as a block service control node (Block Master). Persistence data of the control node 10 can be written in the distributed file system.

The multiple control nodes 10 can compete for becoming the master to have an operation permission on the distributed file system. In order to prevent a split-brain of the control nodes, in some conventional solutions, distributed application coordination service software (such as Zookeeper) is used to enable the control nodes 10 to compete for becoming the master, and distributed lock services are provided in the distributed application coordination service software. The principle is that an exception process will release a distributed lock after an exception occurs in a lock maintaining service, other processes continuously compete for the lock to ensure that exceptions are detected and services are taken over as soon as possible. Taking the lock indicates having the right to provide external services, and the external services can be started.

For the distributed lock services, service switching needs to wait for timeout of the lock before switching. In a distributed environment, this timeout time is above the second level. In a large-scale and complex environment, in order to tolerate short-term exceptions, this timeout time is made longer, resulting in a low service switching efficiency.

In some embodiments of the present disclosure, in order to improve the service switching efficiency, a condition file (also known as an Inline file) can be configured on a metadata service node. In some embodiments of the present disclosure, the condition file is a customized file that does not contain data, or information such as the file length, chunk quantity, etc. The condition file refers to a file that provides an operating condition for the control node 10 to operate data in the distributed file system 30. The condition file includes an operation interface. The operation interface includes but is not limited to a Seal File interface, an Update Inline File interface, a Start Inline File interface, and the like. The seal file refers to performing a sealing operation on the file to prevent a write operation on the file. The control node 10 can call the operation interface of the condition file to compete for an operation permission on the condition file. The control node that acquires the operation permission on the condition file is the master control node. The master control node acquires an operation permission on the distributed file system 30. The operation permission on the distributed file system 30 can include: an operation permission on data in the distributed file system 30 (such as chunks in FIG. 1 and FIG. 2), an operation permission on metadata in the distributed file system 30, and so on.

Specifically, as shown in FIG. 1 and FIG. 2, the control nodes 10 can become the master control node by competing for the permission to update the condition file and, as the master control node, have the operational condition for the data in the distributed file system 30, thereby achieving the switching between master and slave control nodes. Compared with the distributed lock method, this method of competing for becoming the master does not require waiting for failure of the distributed lock, which improves the efficiency of switching between master and slave control nodes.

Figure 3:
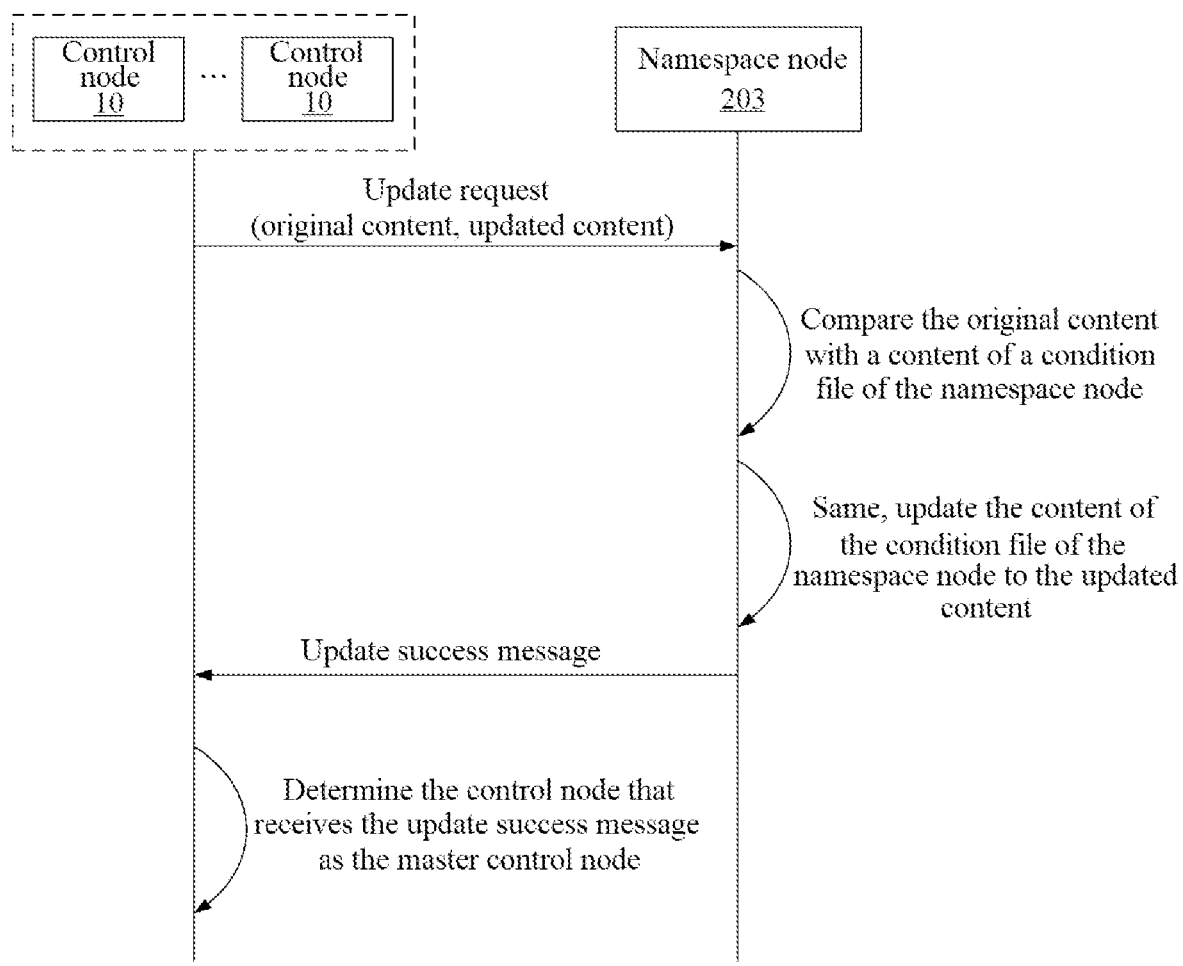
FIG. 3 is a schematic flowchart of updating a condition file in a distributed storage system, according to some embodiments of the present disclosure.

Specifically, as shown in FIG. 3, the control nodes 10 can provide update requests to the namespace node 203 when competing for becoming the master. The update request provided by each control node 10 includes an updated content of the condition file and an original content of the condition file recorded by the control node.

The namespace node 203 can receive the update request provided by the control node 10 and compare the original content of the condition file recorded by the control node carried by the update request with a content of the condition file on the namespace node 203. For the centralized metadata service method, various metadata service nodes run in the same process, and therefore, the multiple metadata service nodes can be configured with the same condition file. Correspondingly, the condition file on the namespace node 203 is the condition file shared by the multiple metadata service nodes.

For the distributed metadata service method, various metadata service nodes run in different independent processes, and therefore, each metadata service node can be configured with a condition file for the distributed metadata service node. For the distributed metadata service method, each metadata service node is configured with a condition file. Correspondingly, the condition file on the namespace node 203 is an independent condition file on the namespace node 203.

Furthermore, for a target update request where the original content of the carried condition file is the same as the content of the condition file on the namespace node, the namespace node 203 can update the content of the condition file on the namespace node to the updated content carried by the target update request, so as to obtain a target condition file, thereby implementing the update of the condition file on the namespace node 203. Furthermore, the namespace node 203 can return an update success message to the control node 10 that provides the target update request.

The control node 10 that provides the target update request can receive the update success message, and determine that the control node that receives the update success message is the master control node. In this way, it can be ensured that only one control node successfully becomes the master at the same moment.

The master control node that successfully becomes the master can further use the updated target condition file as a condition to perform seal processing on data being written in the distributed file system, so as to prevent writing operations of other control nodes in the control nodes 10, except for the master control node, on the data being written in the distributed file system, and prevent other control nodes from continuing to write to the data in the distributed file system. Sealing the data being written in the distributed file system specifically refers to forcibly releasing a file lock on the data being written in the distributed file system, thereby preventing write operations on the data being written in the distributed file system.

Afterwards, the master control node can operate on the distributed file system with the target condition file as the condition. Specifically, an operation request initiated by the master control node carries a content of the target condition file. The metadata service node compares the content of the condition file carried by the operation request with the content of the stored condition file to see whether they are the same. If the contents are the same, it is determined that the master control node has the operation permission on the distributed file system, allowing the master control node to operate on the distributed file system.

An example illustration of an operation process of data in the distributed file system under the distributed metadata service method is described below, in which the master control node takes the condition file as the condition. The operation of the master control node on data refers to an operation on the data itself in the distributed file system, such as opening a file (Open File), opening a write file (such as an Open4Apend operation), sealing a file (Seal File), and releasing a lock and sealing a file (a Release Lock and Seal operation), but not limited thereto.

Figure 4:
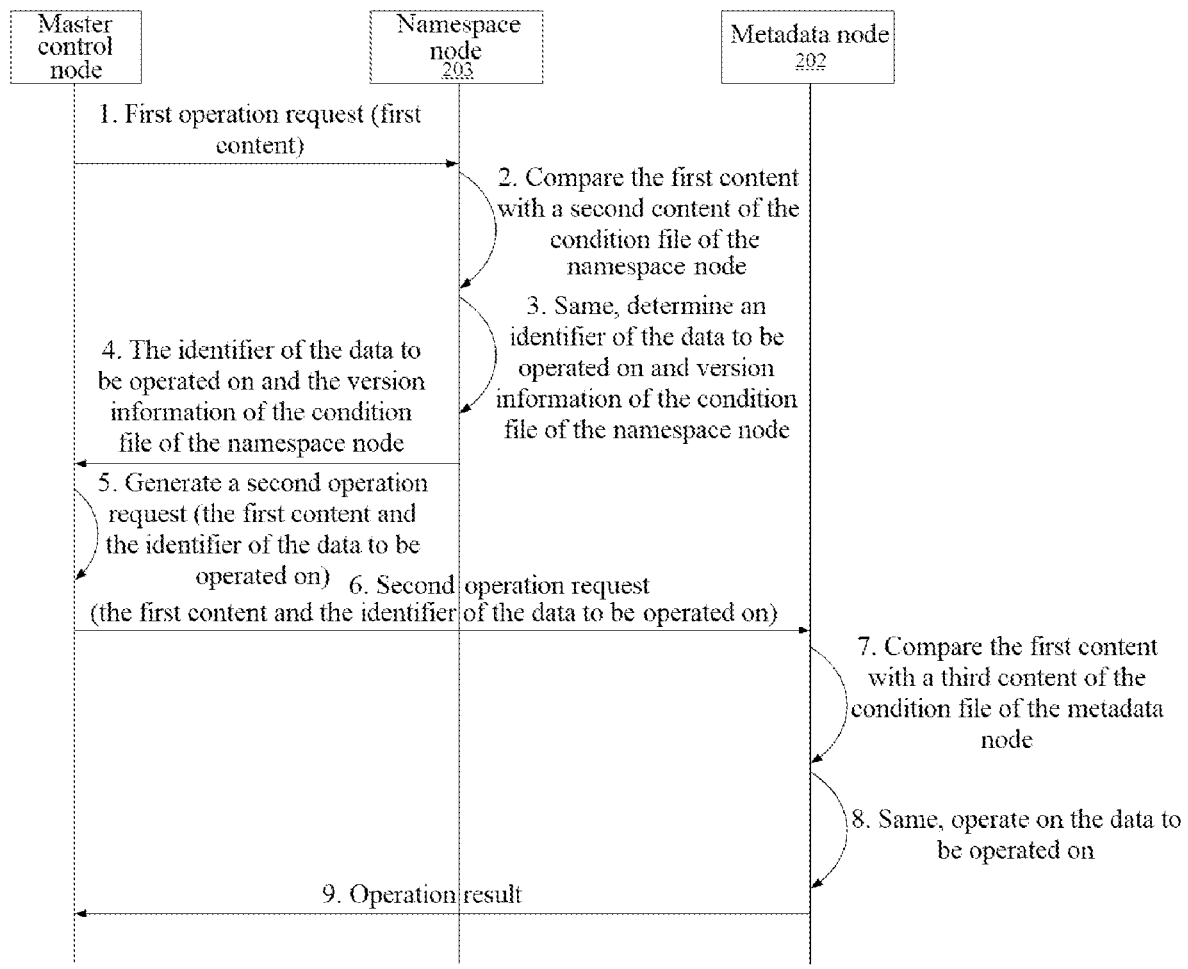
FIG. 4 is a schematic flowchart of performing operations in a distributed metadata service scenario by a distributed storage system, according to some embodiments of the present disclosure.

As shown in FIG. 4, the master control node can provide an operation request to the namespace node 203 (corresponding to step 1 of FIG. 4) when it needs to perform operation on the data in the distributed file system 30. The operation request can include the content (defined as a first content) of the condition file recorded by the master control node and operation information.

The namespace node 203 can receive the operation request and acquire the first content of the condition file recorded by the master control node from the operation request (corresponding to step 2 in FIG. 4). Furthermore, the namespace node 203 can compare the first content of the condition file recorded by the master control node with the content (defined as a second content) of the condition file on the namespace node. If the first content of the condition file recorded by the master control node is the same as the second content of the condition file on the namespace node, the namespace node 203 can determine an identifier (such as INode information) of data to be operated for the operation request and an identifier of the condition file on the namespace node (corresponding to step 3 of FIG. 4). The identifier of the condition file on the namespace node refers to information that uniquely identifies a condition file, which can include the name and version information of the condition file.

Furthermore, the namespace node 203 can return the identifier (such as the INode information) of the data to be operated on and the version information of the condition file on the namespace node to the master control node (corresponding to step 4 of FIG. 4). The master control node can receive the identifier (such as the INode information) of the data to be operated for the operation request and the version information of the condition file on the namespace node, and generate another operation request based on the first content of the condition file recorded by the master control node and the identifier (such as the INode information) of the data to be operated for the operation request (corresponding to step 5 of FIG. 4), and send the operation request to the metadata node 202 (corresponding to step 6 in FIG. 4). In some embodiments of the present disclosure, for the convenience of description and differentiation, the operation request sent by the master control node to the namespace node 203 is defined as a first operation request, and the operation request sent by the master control node to the metadata node 202 is defined as a second operation request.

Correspondingly, the metadata node 202 can receive the second operation request and acquire, from the second operation request, the first content of the condition file recorded by the master control node and the identifier (such as the INode information) of the data to be operated for the operation request.

Furthermore, the metadata node 202 can compare whether the first content of the condition file recorded by the master control node is consistent with a content (defined as a third content) of the condition file on the metadata node 202 (corresponding to step 7 of FIG. 4). If the first content of the condition file recorded by the master control node is consistent with the third content of the condition file on the metadata node 202, it is determined that the master control node has the operation permission for the data to be operated on, and can operate the data to be operated according to the second operation request (corresponding to step 8 in FIG. 4). The metadata node 202 can return an operation result corresponding to the second operation request to the master control node (corresponding to step 9 in FIG. 4). Correspondingly, if the content of the condition file recorded by the master control node is inconsistent with the content of the condition file on the metadata node 202, it is determined that the master control node does not have an operation permission for the data to be operated on, and the metadata node 202 can return an operation failure message or a "no operation permission" prompt message to the master control node.

As can be seen based on the above process, in distributed metadata services, to achieve the operation on data in the distributed file system 30 by the master control node, consistency of condition files among distributed metadata service nodes is required. Therefore, in an application scenario of the distributed metadata services, how to achieve consistency of condition files among distributed metadata service nodes is an urgent technical problem to be solved in the distributed metadata services.

Figure 5:
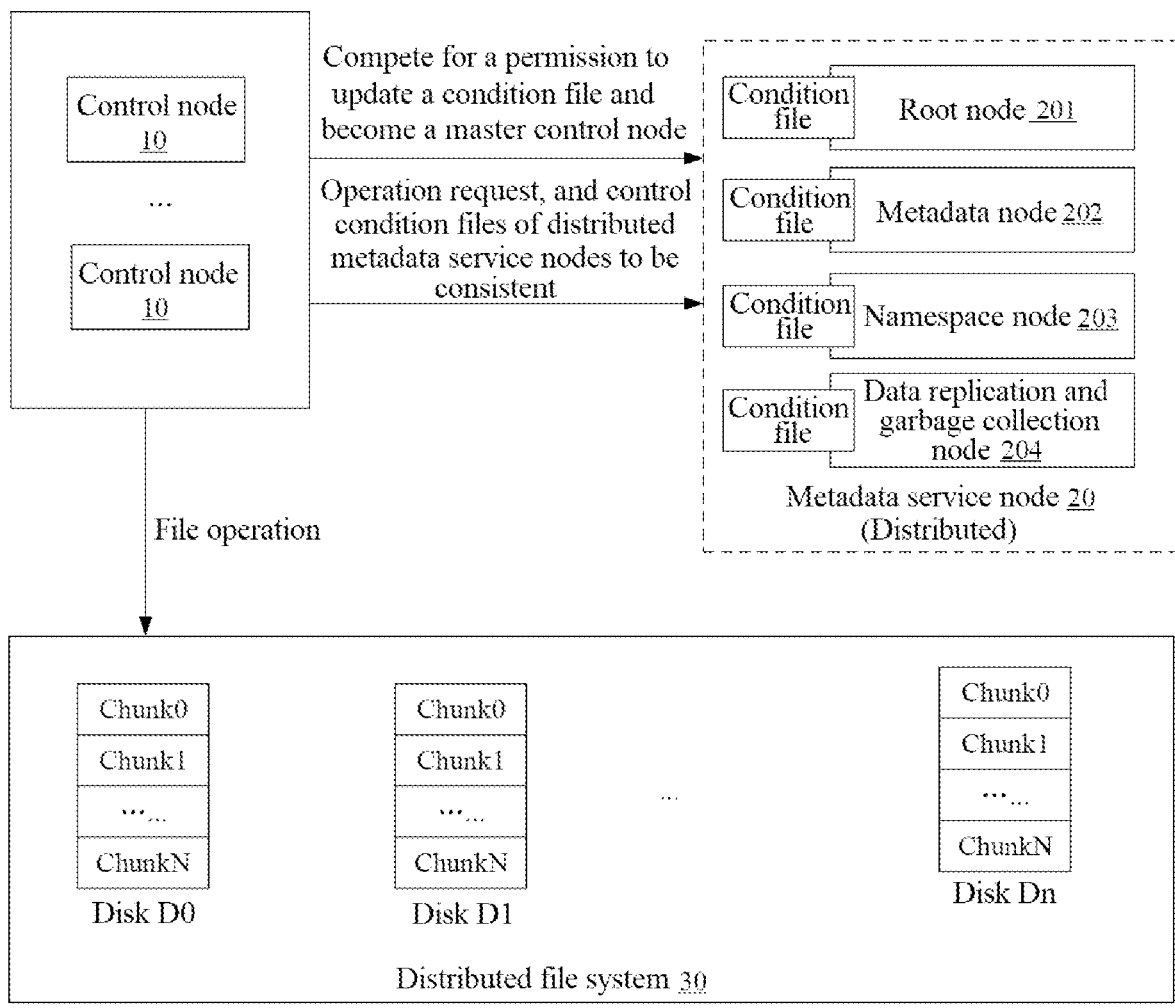
FIG. 5 is a schematic flowchart of achieving condition file consistency between distributed metadata service nodes in a distributed metadata service scenario, according to some embodiments of the present disclosure.

As can be seen based on the operation process of the master control node on the data in the distributed file system 30 shown in FIG. 4, the master control node implements the operation based on the condition file of each distributed metadata service node in the distributed metadata service nodes as the condition in the operation process of the data. Therefore, in some embodiments of the present disclosure, in order to ensure the consistency of the condition files among the distributed metadata service nodes, as shown in FIG. 5, the master control node can utilize the operation on the data in the distributed file system 30 to control the consistency of the condition files of the distributed metadata service nodes. Specifically, the master control node mainly utilizes the operation on the data in the distributed file system 30 to control the consistency of condition files on the metadata node 202 and the namespace node 203 in the distributed metadata service nodes.

An example illustration is made on a specific implementation of the master control node controlling the consistency of the condition files of the distributed metadata service nodes by the operation on the data in the distributed file system 30 below with reference to the specific implementation shown in FIG. 6. The description of steps 1 to 4 in FIG. 6 can be obtained with reference to the relevant content of steps 1 to 4 in FIG. 4 above, and will not be repeated here.

Figure 6:
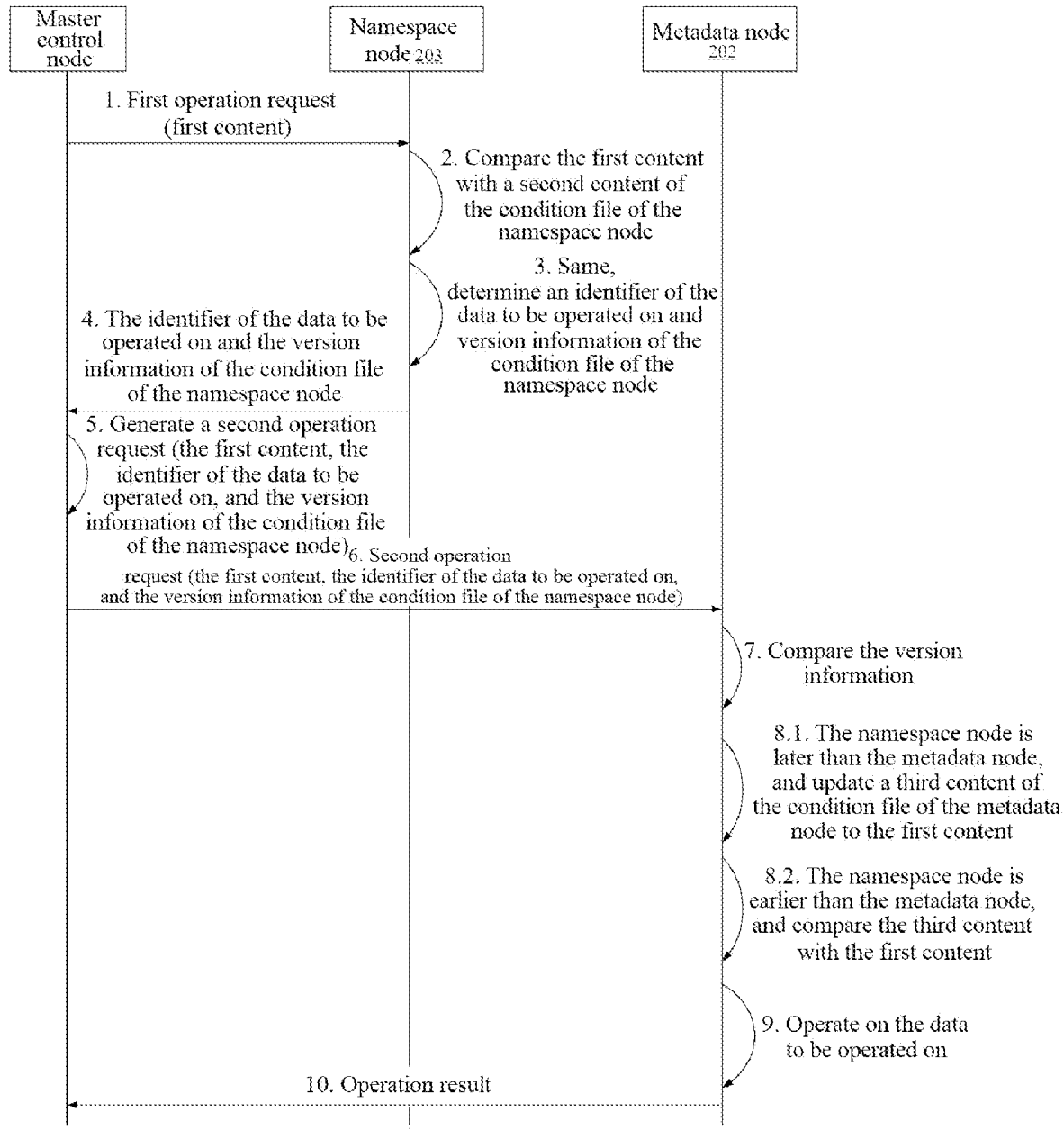
FIG. 6 is a schematic diagram of a specific implementation for achieving condition file consistency between distributed metadata service nodes in a distributed metadata service scenario of a distributed storage system, according to some embodiments of the present disclosure.

In step 5 of FIG. 6, the master control node can generate a second operation request based on the content of the condition file recorded by the master control node, the identifier (such as the INode information) of the data to be operated for the operation request, and the version information of the condition file in the namespace node 203. The master control node can send the second operation request to the metadata node 202 (corresponding to step 6 in FIG. 6).

Correspondingly, the metadata node 202 can receive the second operation request and acquire, from the second operation request, the content of the condition file recorded by the master control node, the identifier (such as the INode information) of the data to be operated for the operation request, and the version information of the condition file of the namespace node 203.

Furthermore, the metadata node 202 can compare the version information of the condition file of the metadata node 202 with that of the condition file of the namespace node 203 (corresponding to step 7 in FIG. 6). If the version information of the condition file of the namespace node 203 is later than the version information of the condition file of the metadata node 202, it indicates that the condition file of the namespace node 203 is updated, while the condition file of the metadata node 202 is not updated. The version information of the condition file of the namespace node 203 being later than the version information of the condition file of the metadata node 202 can be implemented as that a version number of the condition file of the namespace node 203 is greater than a version number of the condition file of the metadata node 202. Therefore, if the version information of the condition file of the namespace node 203 is later than the version information of the condition file of the metadata node 202, the content of the condition file of the metadata node 202 can be updated to the content of the condition file recorded by the master control node (corresponding to step 8.1 in FIG. 6).

Because of the consistency between the content of the condition file recorded by the master control node and the content of the condition file of the namespace node 203, after the content of the condition file of the metadata node 202 is updated to the content of the condition file recorded by the master control node, the content of the condition file of the metadata node 202 is consistent with the content of the condition file of the namespace node 203, thereby implementing the consistency of the condition files on the metadata node 202 and the namespace node 203.

Furthermore, the metadata node 202 can operate, according to the second operation request, the data to be operated on (corresponding to step 9 in FIG. 6). The metadata node 202 can return an operation result corresponding to the second operation request to the master control node (corresponding to step 10 in FIG. 6).

Correspondingly, if the version information of the condition file of the namespace node 203 is earlier than the version information of the condition file of the metadata node 202, it indicates that there may be another control node successfully becoming the master. Correspondingly, in the case that the version information of the condition file of the namespace node 203 is earlier than the version information of the condition file of the metadata node 202, the metadata node 202 can also compare the content of the condition file of the metadata node with the content of the condition file recorded by the master control node (corresponding to step 8.2 in FIG. 6). If the content of the condition file of the metadata node is the same as the content of the condition file recorded by the master control node, the metadata node 202 can operate, according to the second operation request, the data to be operated (corresponding to step 9 in FIG. 6). The metadata node 202 may return the operation result corresponding to the second operation request to the master control node (corresponding to step 10 in FIG. 6). Correspondingly, if the content of the condition file of the metadata node is different from the content of the condition file recorded by the master control node, it is determined that the master control node has no operation permission on the data, and the metadata node 202 can return an operation failure message and/or a "no operation permission" prompt information to the master control node.

In some embodiments of the present disclosure, in the distributed metadata service application scenario, by utilizing the master control node to operate the data in the distributed file system to achieve consistency in the condition files among the distributed metadata service nodes, the master control node can successfully operate the data, which improves the performance of the distributed file system.

In some embodiments of the present disclosure, the distributed storage system can not only update the condition file, but also support the deletion of the condition file. An example illustration of a deletion process of the condition file is made below.

For the distributed metadata service nodes, there is a one-to-many relationship between the namespace node 203 and the metadata node 202. This is mainly because the identifier (such as the INode) of data on a directory tree can be managed by multiple metadata nodes 202. Therefore, the condition file of the namespace node 203 has a one-to-many relationship with the condition file of the metadata node 202. Based on this, the namespace node 203, upon receiving a condition file deletion request, needs to initiate the condition file deletion request to the multiple corresponding metadata nodes 202.

Specifically, the master control node can send a condition file deletion request to the namespace node 203 when it is needed to delete the condition file. The condition file deletion request can include: an identifier (such as a name) of the condition file to be deleted and a content of the condition file to be deleted recorded by the master control node.

The namespace node 203 can receive the condition file deletion request and, in response to the condition file deletion request, determine a target metadata node configured with the condition file to be deleted. Specifically, the namespace node 203 can acquire, from the condition file deletion request, the identifier of the condition file to be deleted and the content of the condition file to be deleted recorded by the master control node. Furthermore, the namespace node 203 can determine, according to the identifier of the condition file to be deleted, the target metadata node configured with the condition file to be deleted. Optionally, the namespace node 203 can also compare whether the content of the condition file to be deleted recorded by the master control node is the same as the content of the condition file to be deleted on the namespace node 203. If they are the same, the namespace node 203 can determine that the master control node has an operation permission on the condition file to be deleted. Correspondingly, if the content of the condition file to be deleted recorded by the master control node is different from the content of the condition file to be deleted on the namespace node 203, the namespace node 203 can determine that the master control node does not have an operation permission on the condition file to be deleted, and deletion failure information and/or a "no operation permission" prompt information can be returned to the master control node.

If the content of the condition file to be deleted recorded by the master control node is the same as the content of the condition file to be deleted on the namespace node 203, the namespace node 203 can send a condition file deletion request to the target metadata node. Specifically, the namespace node 203 can generate a condition file deletion request based on the identifier of the condition file to be deleted and the content of the condition file to be deleted in the namespace node 203. The condition file deletion request includes the identifier of the condition file to be deleted and the content of the condition file to be deleted in the namespace node 203.

In some embodiments of the present disclosure, for the convenience of description and differentiation, the condition file deletion request sent by the master control node to the namespace node 203 is defined as a first condition file deletion request, and the condition file deletion request sent by the namespace node 203 to the target metadata node is defined as a second condition file deletion request.

Correspondingly, the target metadata node can receive the second condition file deletion request and delete the condition file to be deleted in response to the second condition file deletion request. Specifically, the target metadata node can acquire, from the second condition file deletion request, the identifier of the condition file to be deleted and the content of the condition file to be deleted in the namespace node 203 and compare whether the content of the condition file to be deleted on the target metadata node is consistent with the content of the condition file to be deleted in the namespace node 203. If they are consistent, the target metadata node can delete the condition file to be deleted and return a deletion success message to the namespace node 203. If they are inconsistent, the target metadata node can return deletion failure information to the namespace node 203.

Correspondingly, the namespace node 203 can delete the condition file to be deleted in response to the deletion success message. Specifically, the namespace node 203 deletes the condition file to be deleted upon receiving the deletion success messages returned by all target metadata nodes.

In some cases, in the process of the namespace node 203 controlling, through the condition file deletion request, the metadata node 202 to delete the condition file to be deleted, there may be other requests for the condition file to be deleted in the metadata node 202. If the deletion is performed blindly, it can cause a failure of other request operations, thereby affecting the performance of the distributed file system. In order to solve the above problems, in some embodiments of the present disclosure, the namespace node 203 can, in response to the first condition file deletion request, time a delay duration. When the delay duration reaches a set duration, the namespace node 203 can send the second condition file deletion request to the target metadata node. The duration can be set according to a required duration for operating the condition file of the metadata node 202 of historical requests. The duration is set to be greater than or equal to the required duration for operating the condition file of the metadata node 202 of historical requests. In this way, delayed deletion of the condition file on the target metadata node can be achieved, which can reduce the probability of failures of other request operations.

Alternatively, in some embodiments, the metadata node 202 can periodically query the condition file of the namespace node 203 according to a set query cycle. If a condition file found in the metadata node 202 is non-existent in the namespace node 203, the condition file being non-existent in the namespace node 203 is deleted from the metadata node 202, thereby achieving consistency between the condition files of the metadata node and the namespace node.

Optionally, the metadata node 202 can utilize the identifier and content of the condition file on the metadata node 202 to query the condition file of the namespace node 203. Specifically, the metadata node 202 can periodically send query requests to the namespace node 203 according to the set query cycle. The query request includes the identifier and content of the condition file on the metadata node 202. The namespace node 203 can receive the query request and acquire the identifier and content of the condition file on the metadata node 202 from the query request. Furthermore, the namespace node 203 can compare the identifier of the condition file on the metadata node 202 with the identifier of the condition file on the namespace node 203, and compare the content of the condition file on the metadata node 202 with the content of the condition file on the namespace node 203. If the identifier of the condition file on the metadata node 202 is different from the identifier of the condition file on the namespace node 203, or if the content of the condition file on the metadata node 202 is different from the content of the condition file on the namespace node 203, the namespace node 203 can determine that the metadata node 202 has a condition file that does not exist in the namespace node 203.

Furthermore, the namespace node 203 can return prompt information to the metadata node 202 that the condition file corresponding to the query request does not exist. The metadata node 202 can receive the prompt information that the condition file corresponding to the query request does not exist, determine that the metadata node 202 has a condition file that does not exist in the namespace node 203, and delete the condition file that does not exist in the namespace node 203 from the metadata node 202, thereby achieving consistency between the condition files of the metadata node and the namespace node.

In some embodiments of the present disclosure, the control node 10 can not only drive the deletion of condition files, but also drive the creation of condition files. Specifically, the master control node can send a condition file creation request to the namespace node 203, and the condition file creation request can include a content of a condition file to be created.

Correspondingly, the namespace node 203 can create a condition file on the namespace node 203 in response to the condition file creation request. Specifically, the namespace node 203 can acquire, from the condition file creation request, the content of the condition file to be created, and create a condition file on the namespace node 203 according to the content of the condition file to be created. The metadata node 202 can create, on the metadata node 202, a condition file consistent with that of the namespace node 203 in the operation process of the data shown in FIG. 4 above, thereby achieving consistency between the condition files on the metadata node 202 and the namespace node 203.

The master control node can also update the condition file on the distributed metadata service node. The update process of the condition file can be seen in FIG. 3 above, and will not be repeated here. The version information of the condition file on the distributed metadata service node can be increased by 1 for each update.

In some embodiments of the present disclosure, the control node 10 perform operations on the data in the distributed file system, some of which require operations on the data itself, such as opening a file (Open File), opening a write file (e.g., an Open4Apend operation), sealing a file (Seal File), and releasing a lock and sealing a file (a Release Lock and Seal operation), but not limited thereto. Other operations only require operations on the metadata (such as a directory) of the data, for example, operations such as creating files (Create), deleting files (Delete), and renaming files (Rename). The operation here is an ordinary operation for data in a distributed file system, not for a condition file. Based on this, the master control node, when it is required to operate on a directory of the data, can initiate an operation request (defined as a third operation request) of operating on the directory of the data to the namespace node 203. The third operation request carries the content of the condition file recorded by the master control node.

The namespace node 203 can receive the third operation request and acquire, from the third operation request, the content of the condition file recorded by the master control node. Furthermore, the namespace node 203 can compare the content of the condition file recorded by the master control node with the content of the file condition of the namespace node 203. If the content of the condition file recorded by the master control node is the same as the content of the file condition in the namespace node 203, the namespace node 203 can determine that the master control node has an operation permission on the directory of the data. Furthermore, the namespace node 203 can operate on a directory tree managed by the namespace node 203 according to the third operation request. For example, the third operation request is a file creation request, and the namespace node 203 can add, according to the file creation request, an identifier (such as INode information) of a newly created file to the directory tree managed by the namespace node 203.

It is noted that in the above distributed storage system, operations on condition files (such as updating, creating, and deleting the condition files) are driven by control nodes. In the distributed storage system, the control nodes play the role of clients, thereby achieving client-driven consistency.

In addition to the above embodiments of the distributed storage system, the present disclosure further provides a method for metadata management. An example illustration of the method for metadata management provided in some embodiments of the present disclosure is made below from the perspectives of control nodes and distributed metadata service nodes.

FIG. 7 is a schematic flowchart of a method for metadata management according to some embodiments of the present disclosure. The method is applicable to a master control node. As shown in FIG. 7, the method mainly includes steps 701 and 702.

In step 701, an operation permission on data in a distributed file system is acquired by competing with other control nodes for a permission to update condition files configured for distributed metadata service nodes.

In step 702, by an operation on the data, the condition files of the distributed metadata service nodes are controlled to be updated to be consistent with each other.

FIG. 8 is a schematic flow chart of another method for metadata management according to some embodiments of the present disclosure. The method is applicable to distributed metadata service nodes. As shown in FIG. 8, the method mainly includes steps 801 and 802.

In step 801, an operation request for data in a distributed file system provided by a master control node is acquired.

In step 802, in response to the operation request, condition files of the distributed metadata service nodes are updated to be consistent with each other.

In some embodiments, the description of the distributed file system and the distributed metadata service nodes can be obtained with reference to the relevant content of the system embodiments mentioned above, and will not be repeated here.

In some embodiments of the present disclosure, in order to improve the service switching efficiency, a condition file can be configured on a metadata service node. In step 701, the master control node acquires an operation permission on data in the distributed file system by competing with other control nodes for the permission to update condition files, so as to become the master control node. That is, the multiple control nodes can become the master control node by competing for the permission to update the condition file and have the operation permission on the data as the master control node, thereby achieving the switching between master and slave control nodes. Compared with the distributed lock method, this method of competing for the master does not require waiting for failure of the distributed lock, which improves the efficiency of switching between master and slave control nodes.

Specifically, an update request can be provided to a namespace node. The update request provided by each control node includes an updated content of the condition file and an original content of the condition file recorded by the control node.

The namespace node can receive the update request provided by the control node and compare the original content of the condition file recorded by the control node carried by the update request with a content of the condition file on the namespace node.

Furthermore, for a target update request where the original content of the carried condition file is the same as the content of the condition file on the namespace node, the namespace node can update the content of the condition file on the namespace node to the updated content carried by the target update request, so as to obtain a target condition file, thereby implementing the update of the condition file on the namespace node. In the method shown in FIG. 7, the target update request is provided by the master control node. Furthermore, the namespace node can return an update success message to the control node that provides the target update request.

The control node that provides the target update request can receive the update success message, and it can be determined that the control node that receives the update success message is the master control node. In this way, it can be ensured that only one control node successfully becomes the master at the same moment.

The master control node that successfully becomes the master can further use the updated target condition file as a condition to perform seal processing on data being written in the distributed file system, so as to prevent writing operations of other control nodes in the multiple control nodes, except for the master control node, on the data being written in the distributed file system, and prevent other control nodes from continuing to write to the data in the distributed file system. Sealing the data being written in the distributed file system specifically refers to forcibly releasing a file lock on the data being written in the distributed file system, thereby preventing write operations on the data being written in the distributed file system.

Afterwards, the master control node can operate on the distributed file system with the target condition file as the condition. Specifically, an operation request initiated by the master control node carries a content of the target condition file. The metadata service node compares the content of the condition file carried by the operation request with the content of the stored condition file to see whether they are the same. If the contents are the same, it is determined that the master control node has the operation permission on the distributed file system, allowing the master control node to operate on the distributed file system.

As can be seen based on the operation processes in the distributed metadata management scenario shown in FIG. 4 in the above system embodiments, in distributed metadata services, to achieve the operation on data in the distributed file system by the master control node, consistency of condition files among distributed metadata service nodes is required. Therefore, in an application scenario of the distributed metadata services, how to achieve consistency of condition files among distributed metadata service nodes is an urgent technical problem to be solved in the distributed metadata services.

As can be seen based on the operation process of the master control node on the data in the distributed file system shown in FIG. 4, the master control node implements the operation based on the condition file of each distributed metadata service node in the distributed metadata service nodes in the operation process of the data. Therefore, in some embodiments of the present disclosure, in order to ensure the consistency of the condition files among the distributed metadata service nodes, in step 702, the operation on the data in the distributed file system can be used to control the consistency of the condition files of the distributed metadata service nodes. Correspondingly, for the distributed metadata service node, in step 801, the operation request of the master control node for operations on the data in the distributed file system can be acquired. In step 802, the condition files of the distributed metadata service nodes can be updated to be consistent with each other in response to the operation request.

Specifically, step 702 can be implemented as that the master control node mainly utilizes the operation on the data in the distributed file system to control the consistency of condition files on the metadata node and the namespace node in the distributed metadata service nodes.

Correspondingly, step 802 can be implemented as, by a metadata node and a namespace node in the distributed metadata service nodes, updating, in response to the operation request, condition files on the metadata node and the namespace node to the same condition file.

The specific implementations of step 702 and step 802 can be obtained with reference to relevant content in FIG. 6 above, and will not be repeated here. Based on the above FIG. 6, an optional implementation of the control node mainly utilizing the operation on the data in the distributed file system to control the consistency between the condition files on the metadata node and the namespace node in the distributed metadata service nodes is: providing a first operation request to the namespace node, the first operation request including a first content of a condition file recorded by the master control node, for the namespace node to return an identifier of data to be operated for the first operation request and version information of the condition file on the namespace node in response to the first content being the same as a second content of the condition file on the namespace node; generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

Correspondingly, an optional implementation of updating, by a metadata node and a namespace node in the distributed metadata service nodes, in response to the operation request, condition files on the metadata node and the namespace node to the same condition file includes: receiving, by the metadata node, a first operation request provided by the master control node, the first operation request including a first content of a condition file recorded by the master control node; comparing, by the namespace node, the first content with a second content of the condition file on the namespace node; in response to the first content and the second content being the same, returning, by the namespace node, an identifier of data to be operated for the first operation request and version information of the condition file on the namespace node to the master control node; receiving, by the metadata node, a second operation request generated by the master control node based on the first content, the identifier of the data to be operated on, and the version information of the condition file of the namespace node; and in response to the version information of the condition file of the namespace node being later than the version information of the condition file of the metadata node, updating, by the metadata node, the content of the condition file of the metadata node to the first content.

Because of the consistency between the content of the condition file recorded by the master control node and the content of the condition file of the namespace node, after the content of the condition file of the metadata node is updated to the content of the condition file recorded by the master control node, the content of the condition file of the metadata node is consistent with the content of the condition file of the namespace node, thereby implementing the consistency of the condition files on the metadata node and the namespace node.

Furthermore, the metadata node can be used to operate, according to the second operation request, the data to be operated and to return an operation result corresponding to the second operation request to the master control node. Correspondingly, the master control node can receive the operation result corresponding to the second operation request.

Correspondingly, if the version information of the condition file of the namespace node is earlier than the version information of the condition file of the metadata node, it indicates that there may be another control node successfully competing for the master. Correspondingly, in response to the version information of the condition file of the namespace node being earlier than the version information of the condition file of the metadata node, the metadata node can be used to compare the content of the condition file of the metadata node with the content of the condition file recorded by the master control node. If the content of the condition file of the metadata node is the same as the content of the condition file recorded by the master control node, the metadata node can be used to operate, according to the second operation request, the data to be operated, and to return the operation result corresponding to the second operation request to the master control node. Correspondingly, if the content of the condition file of the metadata node is different from the content of the condition file recorded by the master control node, it is determined that the master control node has no operation permission on the data, and the metadata node can return an operation failure message and/or a "no operation permission" prompt information to the master control node.

In some embodiments of the present disclosure, in the distributed metadata service application scenario, utilizing the master control node to operate the data in the distributed file system to achieve consistency in the condition files among the distributed metadata service nodes can enable the master control node to successfully operate the data, which improves the performance of the distributed file system.

In some embodiments of the present disclosure, the distributed storage system can not only update the condition file, but also support the deletion of the condition file. An example illustration of a deletion process of the condition file is made below.

For the distributed metadata service nodes, there is a one-to-many relationship between the namespace node and the metadata node, this is mainly because the identifier (e.g., the INode) of data on a directory tree can be managed by multiple metadata nodes. Therefore, the condition file of the namespace node has a one-to-many relationship with the condition file of the metadata node. Based on this, the namespace node, upon receiving a condition file deletion request, needs to initiate the condition file deletion request to the corresponding metadata nodes.

Specifically, the master control node can send a condition file deletion request to the namespace node when it is needed to delete the condition file. The condition file deletion request can include an identifier (such as a name) of the condition file to be deleted and a content of the condition file to be deleted recorded by the master control node.

For the distributed metadata service nodes, the namespace node can be used to receive the condition file deletion request and, in response to the condition file deletion request, determine a target metadata node configured with the condition file to be deleted. Specifically, the namespace node can be used to acquire, from the condition file deletion request, the identifier of the condition file to be deleted and the content of the condition file to be deleted recorded by the master control node. Furthermore, the namespace node can be used to determine, according to the identifier of the condition file to be deleted, the target metadata node configured with the condition file to be deleted. Optionally, the namespace node can also be used to compare whether the content of the condition file to be deleted recorded by the master control node is the same as the content of the condition file to be deleted on the namespace node. If they are the same, the namespace node can determine that the master control node has an operation permission on the condition file to be deleted. Correspondingly, if the content of the condition file to be deleted recorded by the master control node is different from the content of the condition file to be deleted on the namespace node, it is determined that the master control node does not have an operation permission on the condition file to be deleted, and the namespace node can return deletion failure information and/or a "no operation permission" prompt information to the master control node.

If the content of the condition file to be deleted recorded by the master control node is the same as the content of the condition file to be deleted on the namespace node, the namespace node can be used to send a condition file deletion request to the target metadata node. Specifically, the namespace node can be used to generate a condition file deletion request based on the identifier of the condition file to be deleted and the content of the condition file to be deleted in the namespace node. The condition file deletion request includes the identifier of the condition file to be deleted and the content of the condition file to be deleted in the namespace node.

In some embodiments of the present disclosure, for the convenience of description and differentiation, the condition file deletion request sent by the master control node to the namespace node is defined as a first condition file deletion request, and the condition file deletion request sent by the namespace node to the target metadata node is defined as a second condition file deletion request.

Correspondingly, the target metadata node can receive the second condition file deletion request and delete the condition file to be deleted in response to the second condition file deletion request. Specifically, the target metadata node can acquire, from the second condition file deletion request, the identifier of the condition file to be deleted and the content of the condition file to be deleted in the namespace node, and compare whether the content of the condition file to be deleted on the target metadata node is consistent with the content of the condition file to be deleted in the namespace node. If they are consistent, the target metadata node can delete the condition file to be deleted and return a deletion success message to the namespace node. If they are inconsistent, the target metadata node can return deletion failure information to the namespace node.

Correspondingly, the namespace node can be used to delete the condition file to be deleted in response to the deletion success message. Specifically, the namespace node deletes the condition file to be deleted upon receiving the deletion success messages returned by all target metadata nodes.

In some cases, in the process of the namespace node controlling, through the condition file deletion request, the metadata node to delete the condition file to be deleted, there may be other requests for the condition file to be deleted in the metadata node. If deletion is performed blindly, it can cause a failure of other request operations, thereby affecting the performance of the distributed file system. In order to solve the above problems, in some embodiments of the present disclosure, the namespace node can be used to, in response to the first condition file deletion request, time a delay duration. When the delay duration reaches a set duration, the namespace node can send the second condition file deletion request to the target metadata node. The duration can be set according to a required duration for operating the condition file of the metadata node of historical requests. The duration is set to be greater than or equal to the required duration for operating the condition file of the metadata node of historical requests. In this way, delayed deletion of the condition file on the target metadata node can be achieved, which can reduce the probability of failures of other request operations.

Alternatively, in some embodiments, the metadata node can be used to periodically query the condition file of the namespace node according to a set query cycle. If a condition file found in the metadata node is non-existent in the namespace node, the condition file being non-existent in the namespace node is deleted from the metadata node, thereby achieving consistency between the condition files of the metadata node and the namespace node. The specific implementation for utilizing the metadata node to periodically query the condition file of the namespace node can be obtained with reference to the relevant content of the system embodiments above, and will not be repeated here.

In some embodiments of the present disclosure, the control node can not only drive the deletion of condition files, but also drive the creation of condition files. Specifically, the master control node can send a condition file creation request to the namespace node, and the condition file creation request can include a content of a condition file to be created.

Correspondingly, for the distributed metadata service nodes, the namespace node can be used to create a condition file on the namespace node in response to the condition file creation request. The specific implementation for creating the condition file can be obtained with reference to the relevant content of the system embodiments above, and will not be repeated here.

In some embodiments of the present disclosure, the control node operates the data in the distributed file system, and some operations need to be performed on the data itself. Based on this, the master control node, when it is required to operate on a directory of the data, can initiate an operation request (defined as a third operation request) of operating on the directory of the data to the namespace node. The third operation request carries the content of the condition file recorded by the master control node.

Correspondingly, for the distributed metadata service nodes, the namespace node can be used to receive the third operation request, and acquire, from the third operation request, the content of the condition file recorded by the master control node. Furthermore, the namespace node can be used to compare the content of the condition file recorded by the master control node with the content of the file condition of the namespace node. If the content of the condition file recorded by the master control node is the same as the content of the file condition in the namespace node, the namespace node can determine that the master control node has an operation permission on the directory of the data. Furthermore, the namespace node can be used to operate on a directory tree managed by the namespace node according to the third operation request.

It is noted that in the above distributed storage system, operations on condition files (such as updating, creating, and deleting the condition files) are driven by control nodes. In the distributed storage system, the control nodes play the role of clients, thereby achieving client-driven consistency.

It should be noted that, the steps of the methods provided in the above embodiments can all be performed by the same device, or the methods can also be performed by different devices. For example, steps 701 and 702 can be performed by a device A. For another example, step 701 can be performed by a device A, and step 702 can be performed by a device B, or the like.

In addition, in some of the processes described in the above embodiments and accompanying drawings, a plurality of operations appearing in a specific order are included, but it should be clearly understood that these operations may not be performed in the order in which they appear herein, or may be performed in parallel. The sequence numbers of the operations, such as 701 and 702, are only used to distinguish different operations, and the sequence numbers themselves do not represent any performing sequence. Additionally, these processes can include more or fewer operations, and these operations can be performed sequentially or in parallel.

Correspondingly, the embodiments of the present disclosure further provide a computer-readable storage medium storing computer instructions, in which the computer instructions, when executed by one or more processors, cause the one or more processors to perform steps in the above methods for metadata management.

FIG. 9 is a schematic structural diagram of a computing device, according to some embodiments of the present disclosure. As shown in FIG. 9, the computing device mainly includes a memory 90a, a processor 90b, and a communication component 90c.

In some embodiments, the computing device can be implemented as a control node. Correspondingly, the processor 90b is coupled to the memory 90a and the communication component 90c, and is configured to execute a computer program for: acquiring an operation permission on data in a distributed file system by competing with other control nodes for a permission to update condition files configured in distributed metadata service nodes; and controlling, by an operation on the data, the condition files of the distributed metadata service nodes to be updated to be consistent with each other, through the communication component 90c.

In some embodiments, the processor 90b, when updating, by the operation on the data, the condition files of the distributed metadata service nodes to be consistent with each other, is specifically configured to: control, by an operation on the data and through the communication component 90c, condition files on a metadata node and a namespace node in the distributed metadata service nodes to be updated to the same condition file.

Optionally, the processor 90b, when controlling, by the operation on the data, condition files on the metadata node and the namespace node in the distributed metadata service nodes to be the same, is specifically configured to: provide, through the communication component 90c, a first operation request to the namespace node, the first operation request including a first content of a condition file recorded by the master control node, for the namespace node to return an identifier of data to be operated for the first operation request and version information of the condition file on the namespace node when the first content is the same as a second content of the condition file on the namespace node; generate a second operation request based on the first content, the identifier of the data to be operated on, and the version information of the condition file of the namespace node; and provide, through the communication component 90c, the second operation request to the metadata node, for the metadata node to update a content of a condition file of the metadata node to the first content when the version information of the condition file of the namespace node is later than version information of the condition file of the metadata node.

Optionally, the processor 90b is further configured to: receive an operation result corresponding to the second operation request returned by the metadata node through the communication component 90c, the operation result being obtained by the metadata node operating, according to the second operation request, the data to be operated after updating the content of the condition file on the metadata node to the first content. Alternatively, if the version information of the condition file of the metadata node on the namespace node is earlier than the version information of the condition file on the metadata node, and the content of the condition file on the metadata node is the same as the first content, the operation result is obtained by operating, according to the second operation request, the data to be operated.

In some embodiments, the processor 90b, when acquiring an operation permission on the data in the distributed file system by competing with other control nodes for the permission to update condition files configured in distributed metadata service nodes, is specifically configured to: provide, through the communication component 90c, an update request to the namespace node, the update request provided including an updated content of the condition file and an original content of the condition file recorded by the control node, so that the namespace node updates the content of the condition file on the namespace node to the updated content when the original content is the same as the content of the condition file on the namespace node, so as to obtain a target condition file; receive, through the communication component 90c, an update success message returned by the namespace node; and determine the control node that receives the update success message as the master control node.

Optionally, the processor 90b is further configured to: use the target condition file as a condition to perform seal processing on first data being written in the distributed file system, so as to prevent writing operations of other control nodes in the multiple control nodes, except for the master control node, on the first data.

Optionally, the processor 90b is further configured to: provide, through the communication component 90c, a third operation request of operating on a directory of data to the namespace node, the third operation request carrying the first content of the condition file recorded by the master control node, so that the namespace node operates on a directory tree managed by the namespace node according to the third operation request when the first content is the same as the second content of the condition file on the namespace node.

Optionally, the processor 90b is further configured to: send, through the communication component 90c, a condition file creation request to the namespace node, so as to create a condition file on the namespace node in response to the condition file creation request.

In some embodiments of the present disclosure, the computing device can be implemented as distributed metadata service nodes. Various metadata service nodes in the distributed metadata service nodes can be implemented as different independent processes in the computing device. Correspondingly, the processor 90b is configured to: acquire, through the communication component 90c, an operation request for data in the distributed file system provided by the master control node; and update condition files of the distributed metadata service nodes to be consistent with each other in response to the operation request. The distributed metadata service nodes manage metadata in different dimensions of the data.

Optionally, the processor 90b, when updating the condition files of the distributed metadata service nodes to be consistent with each other in response to the operation request, is specifically configured to: in response to the operation request, updating, by a metadata node and a namespace node in the distributed metadata service nodes, condition files on the metadata node and the namespace node to the same condition file.

Optionally, the processor 90b, when in response to the operation request, updating, by a metadata node and a namespace node in the distributed metadata service nodes, condition files on the metadata node and the namespace node to the same condition file, is specifically configured to: receive, by the metadata node, a first operation request provided by the master control node, the first operation request including a first content of a condition file recorded by the master control node; compare, by the namespace node, the first content with a second content of the condition file on the namespace node; in response to the first content and the second content are the same, return, by the namespace node, an identifier of data to be operated for the first operation request and version information of the condition file on the namespace node to the master control node; receive, by the metadata node, a second operation request generated by the master control node based on the first content, the identifier of the data to be operated, and the version information of the condition file of the namespace node; and in response to the version information of the condition file of the namespace node being later than version information of the condition file of the metadata node, update, by the metadata node, the content of the condition file of the metadata node to the first content.

Furthermore, the processor 90b is further configured to: after updating the content of the condition file on the metadata node to the first content, operate, by the metadata node, the data to be operated according to the second operation request; and return, by the metadata node, an operation result corresponding to the second operation request to the master control node.

Correspondingly, in response to the version information of the condition file of the namespace node being earlier than the version information of the condition file of the metadata node, the metadata node is used to compare the content of the condition file of the metadata node with the first content. In response to the content of the condition file of the metadata node being the same as the first content, the metadata node is used to operate, according to the second operation request, on the data to be operated. The metadata node is used to return the operation result corresponding to the second operation request to the master control node.

In some embodiments, the processor 90b is further configured to: receive, by the namespace node, a first condition file deletion request sent by the master control node; determine, by the namespace node, in response to the first condition file deletion request, a target metadata node configured with a condition file to be deleted; send, by the namespace node, a second condition file deletion request to the target metadata node; delete, by the target metadata node, the condition file to be deleted in response to the second condition file deletion request; return, by the target metadata node, a deletion success message to the namespace node; and delete, by the namespace node, in response to the deletion success message, the condition file to be deleted.

Optionally, the processor 90b, when sending, by the namespace node, the second condition file deletion request to the target metadata node, is specifically configured to: time, by the namespace node, a delay duration in response to the first condition file deletion request; and in response to the delay duration reaching a set duration, sending, by the namespace node, a second condition file deletion request to the target metadata node.

Optionally, the processor 90b is further configured to: periodically query, by the metadata node, the condition file of the namespace node according to a set query cycle; and in response to a condition file found in the metadata node being non-existent in the namespace node, deleting, by the metadata node, the condition file being non-existent in the namespace node from the metadata node.

Optionally, the processor 90b is further configured to: receive, by the namespace node, a third operation request provided by the master control node to operate on a directory of data, the third operation request carrying the first content of the condition file recorded by the master control node; compare, by the namespace node, the first content with the second content of the condition file on the namespace node; determine, in response to the first content and the second content being the same, that the master control node has an operation permission on the directory of the data; and perform, by the namespace node, according to the third operation request, an operation on the directory tree managed by the namespace node.

Optionally, the processor 90b can further be configured to: receive, through the communication component 90c and by the namespace node, a condition file creation request sent by the master control node; and create, by the namespace node, a condition file on the namespace node in response to the condition file creation request.

In some optional implementations, as shown in FIG. 9, the computing device can further include: optional components such as a power supply component 90d. FIG. 9 only schematically shows some components, which does not mean that the computing device must include all the components shown in FIG. 9, nor does it mean that the computing device can only include the components shown in FIG. 9.

The computing device provided in the embodiments can be deployed in a distributed storage system. In a distributed metadata service application scenario, a distributed metadata service node is configured with a condition file, and a control node acquires an operation permission on data in a distributed file system by competing for a permission to update the condition file, and by an operation of a master control node with the operation permission on the data in the distributed file system, consistency of condition files among distributed metadata service nodes can be achieved, which can enable the master control node to successfully operate the data and improve the performance of the distributed file system.

In some embodiments of the present disclosure, the memory is configured to store a computer program, and may be configured to store other various types of data to support operations on the device where it is located. The one or more processors can execute the computer program stored in the memory to realize the corresponding control logic. The memory can be implemented by any type of volatile or non-volatile storage device or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disc.

In some embodiments of the present disclosure, the one or more processors can be any hardware processing device capable of executing the logic of the above method. Optionally, the processor can be, but not limited to, a Central Processing Unit (CPU), a Graphics Processing Unit (GPU) or a Microcontroller Unit (MCU); it can also be a Field-Programmable Gate Array (FPGA), a Programmable Array Logic (PAL), a General Array Logic (GAL), a Complex Programmable Logic Device (CPLD) and other programmable devices; or an advanced reduced instruction set computer (RISC) Machines (ARM), a System on Chip (SOC), or the like.

In some embodiments of the present disclosure, the communication component is configured to facilitate wired or wireless communication between the device where it is located and other devices. The device where the communication component is located can access a wireless network based on communication standards, such as WiFi, 2G, 3G, 4G, 5G, or a combination thereof. In some exemplary embodiments, the communication component receives a broadcast signal or broadcast related information from an external broadcast management system via a broadcast channel. In some exemplary embodiments, the communication component can also be implemented based on the Near Field Communication (NFC) technology, the Radio Frequency Identification (RFID) technology, the Infrared Data Association (IrDA) technology, the Ultra Wideband (UWB) technology, the Bluetooth (BT) technology, or other technologies.

In some embodiments of the present disclosure, the display component can include a liquid crystal display (LCD) and a touch panel (TP). If the display component includes the touch panel, the display component can be implemented as a touch screen to receive input signals from a user. The touch panel includes one or multiple touch sensors to sense touches, swipes, and gestures on the touch panel. The touch sensor can not only sense a boundary of a touch or swipe action, but also detect a duration and pressure associated with the touch or swipe action.

In some embodiments of the present disclosure, the power supply component is configured to provide power to various components of the device where it is located. A power supply component can include a power management system, one or multiple power supplies, and other components associated with generating, managing, and distributing power to the device in which the power supply component resides.

In some embodiments of the present disclosure, the audio component can be configured to output and/or input audio signals. For example, the audio component includes a microphone (MIC), and the microphone is configured to receive external audio signals when the device where the audio component is located is in an operation mode, such as a call mode, a recording mode, and a speech recognition mode. The received audio signals can be further stored in a memory or sent via a communication component. In some embodiments, the audio component further includes a speaker for outputting audio signals. For example, for a device with a language interaction function, and voice interaction with the user can be realized through the audio component.

It should be noted that the descriptions of "first" and "second" herein are used for distinguishing different messages, devices, modules, and the like, and do not represent the sequence, nor do they limit "first" and "second" are different types.

Persons skilled in the art should understand that the embodiments of the present disclosure can be provided as a method, an apparatus, or a computer program product. Therefore, the present disclosure can be implemented as completely hardware embodiments, completely software embodiments, or some embodiments combing software and hardware. Moreover, the present disclosure can be in the form of a computer program product implemented on one or multiple computer usable storage media (including, but not limited to, a magnetic disk memory, a CD-ROM, an optical memory, and the like) including computer usable program codes.

The present disclosure is described with reference to flow charts and/or block diagrams according to the method, device (system) and computer program product according to the embodiments of the present disclosure. It should be understood that a computer program instruction can be used to implement each process and/or block in the flow charts and/or block diagrams and combinations of processes and/or blocks in the flow charts and/or block diagrams. These computer program instructions can be provided to a processor of a general-purpose computer, a special-purpose computer, an embedded processor, or another programmable data processing device to produce a machine, so that the instructions executed by the processor of the computer or another programmable data processing device produce an apparatus for realizing the functions specified in one or more flows of the flowcharts and/or one or more blocks of the block diagrams.

These computer program instructions can also be stored in a computer-readable memory that can direct a computer or another programmable data processing device to work in a specific manner, so that the instructions stored in this computer-readable memory produce an article of manufacture including an instruction apparatus which implements the functions specified in one or more flows of the flowcharts and/or one or more blocks of the block diagrams.

These computer program instructions can also be loaded onto a computer or another programmable data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

In a typical configuration, a computer device includes one or multiple processors (CPU), an input/output interface, a network interface, and a memory.

The memory can include a volatile memory, a random access memory (RAM) and/or a non-volatile memory or the like in a computer readable medium, for example, a read only memory (ROM) or a flash RAM. The memory is an example of the computer readable medium.

The storage medium of the computer is a readable storage medium, which can also be referred to as a readable medium. The readable storage medium includes non-volatile and volatile media as well as movable and non-movable media, and can implement information storage by means of any method or technology. Information can be a computer readable instruction, a data structure, and a module of a program or other data. A storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read only memory (CD-ROM), a digital versatile disc (DVD) or other optical storages, a cassette tape, a magnetic disk storage or other magnetic storage devices, or any other non-transmission medium, and can be used to store information accessible to the computing device. According to the definition herein, the computer readable medium does not include transitory computer readable media (transitory media), such as a modulated data signal and a carrier.

It should be further noted that, the term "include", "comprise" or other variations thereof are intended to cover non-exclusive inclusion, so that a process, method, commodity, or device including a series of elements not only includes the elements, but also includes other elements not clearly listed, or further includes inherent elements of the process, method, commodity, or device. In a case without any more limitations, an element defined by a statement "including a . . . " does not exclude that the process, method, commodity or device including the element further has other identical elements.

The embodiments can further be described using the following clauses:

1: A system for distributed storage, comprising: a distributed file system for distributed storage of data; distributed metadata service nodes configured to run in different processes and configured to manage metadata of the data, wherein the distributed metadata service nodes are configured with corresponding condition files; control nodes configured to compete for a permission to update the condition file to become a master control node, and obtain an operation permission on the data as the master control node; wherein the master control node is configured to utilize the operation on the data to control consistency of the condition files of the distributed metadata service nodes.

2: The system of clause 1, wherein the distributed metadata service nodes comprise: a metadata node configured to manage an identifier of the data; and a namespace node configured to manage a directory tree of the distributed file system; wherein the master control node is configured to utilize the operation on the data to control consistency of the condition files of the distributed metadata service nodes by the operation on the data to control the condition file on the metadata node to be the same as the condition file on the namespace node.

3: The system of clause 2, wherein when competing for the permission to update the condition file to become the master control node, the control nodes are configured to provide an update request to the namespace node, the update request provided by each control node comprises an updated content of the condition file and an original content of the condition file recorded by the control node; wherein the namespace node is configured to: compare the original content of the condition file recorded by the control node with a content of the condition file on the namespace node; for a target update request carrying the original content the same as the content of the condition file on the namespace node, update the content of the condition file on the namespace node to the updated content carried by the target update request to obtain a target condition file; and return an update success message to the control node providing the target update request; and wherein the control nodes are configured to determine the control node receiving the update success message as the master control node.

4: The system of clause 2 or 3, wherein when utilizing the operation on the data to control the condition file on the metadata node to be the same as the condition file on the namespace node, the master control node is configured to provide a first operation request to the namespace node, the first operation request comprising a first content of the condition file recorded by the master control node; wherein the namespace node is configured to: compare the first content with a second content of the condition file on the namespace node; in response to the first content and the second content being the same, return an identifier of data to be operated on for the first operation request and version information of the condition file on the namespace node to the master control node; wherein the master control node is configured to: generate a second operation request based on the first content, the identifier of the data to be operated on, and the version information of the condition file of the namespace node; and provide the second operation request to the metadata node; and wherein the metadata node is configured to update the content of the condition file of the metadata node to the first content in response to the version information of the condition file of the namespace node being later than the version information of the condition file of the metadata node.

5: A method for metadata management, applicable to a master control node, comprising: acquiring an operation permission on data in a distributed file system by competing with other control nodes for a permission to update condition files configured in distributed metadata service nodes; and controlling, by an operation on the data, the condition files of the distributed metadata service nodes to be updated to be consistent with each other.

6: The method of clause 5, wherein controlling, by the operation on the data, the condition files of the distributed metadata service nodes to be updated to be consistent with each other comprises: controlling, by the operation on the data, condition files on a metadata node and a namespace node in the distributed metadata service nodes to be updated to the same condition file.

7: The method of clause 6, wherein controlling, by the operation on the data, the condition files on the metadata node and the namespace node in the distributed metadata service nodes to be the same comprises: providing a first operation request to the namespace node, the first operation request comprising a first content of the condition file recorded by the master control node, for the namespace node to return an identifier of data to be operated on for the first operation request and version information of the condition file on the namespace node in response to the first content being the same as a second content of the condition file on the namespace node; generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

8: A method for metadata management, applicable to distributed metadata service nodes, comprising: acquiring an operation request for data in a distributed file system provided by a master control node; and updating, in response to the operation request, condition files of the distributed metadata service nodes to be consistent with each other.

9: The method of clause 8, wherein updating, in response to the operation request, the condition files of the distributed metadata service nodes to be consistent with each other comprises: updating, by a metadata node and a namespace node in the distributed metadata service nodes, in response to the operation request, condition files on the metadata node and the namespace node in the distributed metadata service nodes to the same condition file.

10: The method of clause 9, wherein updating, by the metadata node and the namespace node in the distributed metadata service nodes, in response to the operation request, the condition files on the metadata node and the namespace node in the distributed metadata service nodes to the same condition file comprises: receiving, by the metadata node, a first operation request provided by the master control node, the first operation request comprising a first content of the condition file recorded by the master control node; comparing, by the namespace node, the first content with a second content of the condition file on the namespace node; in response to the first content and the second content being the same, returning, by the namespace node, an identifier of data to be operated on for the first operation request and version information of the condition file on the namespace node to the master control node; receiving, by the metadata node, a second operation request generated by the master control node based on the first content, the identifier of the data to be operated on, and the version information of the condition file of the namespace node; and in response to the version information of the condition file of the namespace node being later than the version information of the condition file of the metadata node, updating, by the metadata node, the content of the condition file of the metadata node to the first content.

11: The method of clause 9 or clause 10, further comprising: receiving, by the namespace node, a first condition file deletion request sent by the master control node; in response to the first condition file deletion request, determining, by the namespace node, a target metadata node configured with a condition file to be deleted; sending, by the namespace node, a second condition file deletion request to the target metadata node; in response to the second condition file deletion request, deleting, by the target metadata node, the condition file to be deleted; returning, by the target metadata node, a deletion success message to the namespace node; and in response to the deletion success message, deleting, by the namespace node, the condition file to be deleted.

12: The method of clause 11, wherein sending, by the namespace node, the second condition file deletion request to the target metadata node comprises: in response to the first condition file deletion request, timing, by the namespace node, a delay duration; and in response to the delay duration reaching a set duration, sending, by the namespace node, a second condition file deletion request to the target metadata node.

13: The method of any of clauses 9-12, further comprising: periodically querying, by the metadata node, the condition file of the namespace node according to a set query cycle; and in response to a condition file found in the metadata node being non-existent in the namespace node, deleting, by the metadata node, the condition file being non-existent in the namespace node from the metadata node.

14: A computing device, comprising: a memory for storing a computer program; a communication component; and one or more processors coupled to the memory and the communication component and configured to execute the computer program to perform operations comprising: acquiring an operation permission on data in a distributed file system by competing with other control nodes for a permission to update condition files configured in distributed metadata service nodes; and controlling, by an operation on the data, the condition files of the distributed metadata service nodes to be updated to be consistent with each other.

15: The computing device of clause 14, wherein controlling, by the operation on the data, the condition files of the distributed metadata service nodes to be updated to be consistent with each other comprises: controlling, by the operation on the data, condition files on a metadata node and a namespace node in the distributed metadata service nodes to be updated to the same condition file.

16: The computing device of clause 15, wherein controlling, by the operation on the data, the condition files on the metadata node and the namespace node in the distributed metadata service nodes to be the same comprises: providing a first operation request to the namespace node, the first operation request comprising a first content of the condition file recorded by a master control node, for the namespace node to return an identifier of data to be operated on for the first operation request and version information of the condition file on the namespace node in response to the first content being the same as a second content of the condition file on the namespace node; generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

17: A computing device, comprising: a memory for storing a computer program; a communication component; and one or more processors coupled to the memory and the communication component and configured to execute the computer program to perform operations comprising: acquiring an operation request for data in a distributed file system provided by a master control node; and updating, in response to the operation request, condition files of distributed metadata service nodes to be consistent with each other.

18: The computing device of clause 17, wherein updating, in response to the operation request, the condition files of the distributed metadata service nodes to be consistent with each other comprises: updating, by a metadata node and a namespace node in the distributed metadata service nodes, in response to the operation request, condition files on the metadata node and the namespace node in the distributed metadata service nodes to the same condition file.

19: The computing device of clause 18, wherein updating, by the metadata node and the namespace node in the distributed metadata service nodes, in response to the operation request, the condition files on the metadata node and the namespace node in the distributed metadata service nodes to the same condition file comprises: receiving, by the metadata node, a first operation request provided by the master control node, the first operation request comprising a first content of the condition file recorded by the master control node; comparing, by the namespace node, the first content with a second content of the condition file on the namespace node; in response to the first content and the second content being the same, returning, by the namespace node, an identifier of data to be operated on for the first operation request and version information of the condition file on the namespace node to the master control node; receiving, by the metadata node, a second operation request generated by the master control node based on the first content, the identifier of the data to be operated on, and the version information of the condition file of the namespace node; and in response to the version information of the condition file of the namespace node being later than the version information of the condition file of the metadata node, updating, by the metadata node, the content of the condition file of the metadata node to the first content.

20: The computing device of clause 18 or clause 19, wherein the operations further comprise: receiving, by the namespace node, a first condition file deletion request sent by the master control node; in response to the first condition file deletion request, determining, by the namespace node, a target metadata node configured with a condition file to be deleted; sending, by the namespace node, a second condition file deletion request to the target metadata node; in response to the second condition file deletion request, deleting, by the target metadata node, the condition file to be deleted;

returning, by the target metadata node, a deletion success message to the namespace node; and in response to the deletion success message, deleting, by the namespace node, the condition file to be deleted.

21: The computing device of clause 20, wherein sending, by the namespace node, the second condition file deletion request to the target metadata node comprises: in response to the first condition file deletion request, timing, by the namespace node, a delay duration; and in response to the delay duration reaching a set duration, sending, by the namespace node, a second condition file deletion request to the target metadata node.

22: The computing device of any of clauses 18-21, wherein the operations further comprise: periodically querying, by the metadata node, the condition file of the namespace node according to a set query cycle; and in response to a condition file found in the metadata node being non-existent in the namespace node, deleting, by the metadata node, the condition file being non-existent in the namespace node from the metadata node.

23: A non-transitory computer-readable storage medium storing computer instructions that are executable by one or more processors of a device to cause the device to perform operations comprising: acquiring an operation permission on data in a distributed file system by competing with other control nodes for a permission to update condition files configured in distributed metadata service nodes; and controlling, by an operation on the data, the condition files of the distributed metadata service nodes to be updated to be consistent with each other.

24: The non-transitory computer-readable storage medium of clause 23, wherein controlling, by the operation on the data, the condition files of the distributed metadata service nodes to be updated to be consistent with each other comprises: controlling, by the operation on the data, condition files on a metadata node and a namespace node in the distributed metadata service nodes to be updated to the same condition file.

25: The non-transitory computer-readable storage medium of clause 24, wherein controlling, by the operation on the data, the condition files on the metadata node and the namespace node in the distributed metadata service nodes to be the same comprises: providing a first operation request to the namespace node, the first operation request comprising a first content of the condition file recorded by a master control node, for the namespace node to return an identifier of data to be operated on for the first operation request and version information of the condition file on the namespace node in response to the first content being the same as a second content of the condition file on the namespace node; generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

26: A non-transitory computer-readable storage medium storing computer instructions that are executable by one or more processors of a device to cause the device to perform operations comprising: acquiring an operation request for data in a distributed file system provided by a master control node; and updating, in response to the operation request, condition files of distributed metadata service nodes to be consistent with each other.

27: The non-transitory computer-readable storage medium of clause 26, wherein updating, in response to the operation request, the condition files of the distributed metadata service nodes to be consistent with each other comprises: updating, by a metadata node and a namespace node in the distributed metadata service nodes, in response to the operation request, condition files on the metadata node and the namespace node in the distributed metadata service nodes to the same condition file.

28: The non-transitory computer-readable storage medium of clause 27, wherein updating, by the metadata node and the namespace node in the distributed metadata service nodes, in response to the operation request, the condition files on the metadata node and the namespace node in the distributed metadata service nodes to the same condition file comprises: receiving, by the metadata node, a first operation request provided by the master control node, the first operation request comprising a first content of the condition file recorded by the master control node; comparing, by the namespace node, the first content with a second content of the condition file on the namespace node; in response to the first content and the second content being the same, returning, by the namespace node, an identifier of data to be operated on for the first operation request and version information of the condition file on the namespace node to the master control node; receiving, by the metadata node, a second operation request generated by the master control node based on the first content, the identifier of the data to be operated on, and the version information of the condition file of the namespace node; and in response to the version information of the condition file of the namespace node being later than the version information of the condition file of the metadata node, updating, by the metadata node, the content of the condition file of the metadata node to the first content.

29: The non-transitory computer-readable storage medium of clause 27 or clause 28, wherein the operations further comprise: receiving, by the namespace node, a first condition file deletion request sent by the master control node; in response to the first condition file deletion request, determining, by the namespace node, a target metadata node configured with a condition file to be deleted; sending, by the namespace node, a second condition file deletion request to the target metadata node; in response to the second condition file deletion request, deleting, by the target metadata node, the condition file to be deleted; returning, by the target metadata node, a deletion success message to the namespace node; and in response to the deletion success message, deleting, by the namespace node, the condition file to be deleted.

30: The non-transitory computer-readable storage medium of clause 30, wherein sending, by the namespace node, the second condition file deletion request to the target metadata node comprises: in response to the first condition file deletion request, timing, by the namespace node, a delay duration; and in response to the delay duration reaching a set duration, sending, by the namespace node, a second condition file deletion request to the target metadata node.

31: The non-transitory computer-readable storage medium of any of clauses 27-30, wherein the operations further comprise: periodically querying, by the metadata node, the condition file of the namespace node according to a set query cycle; and in response to a condition file found in the metadata node being non-existent in the namespace node, deleting, by the metadata node, the condition file being non-existent in the namespace node from the metadata node.

The above descriptions are merely embodiments of the present disclosure, and are not intended to limit the present disclosure. For those skilled in the art, the present disclosure can have various alterations and changes. Any modification, equivalent replacement, improvement or the like made without departing from the spirit and principle of the present disclosure should all fall within the scope of claims of the present disclosure.

What is claimed is:

1. A system for distributed storage, comprising:
    a distributed file system for distributed storage of data;
    distributed metadata service nodes configured to run in different processes and configured to manage metadata of the data, wherein the distributed metadata service nodes are configured with corresponding condition files;
    control nodes configured to compete for a permission to update a condition file of a metadata service node to become a master control node, and obtain an operation permission on the data as the master control node, wherein the condition files are files configured to provide an operating condition for the control nodes to operate data in the distributed file system;
    wherein the master control node is configured to utilize the operation on the data to control consistency of the condition files of the distributed metadata service nodes.

2. The system of claim 1, wherein the distributed metadata service nodes each comprise:
    a metadata node configured to manage an identifier of the data; and
    a namespace node configured to manage a directory tree of the distributed file system;
    wherein the master control node is configured to utilize the operation on the data to control consistency of the condition files of the distributed metadata service nodes by the operation on the data to control a condition file on the metadata node to be the same as a condition file on the namespace node.

3. The system of claim 2, wherein when competing for the permission to update the condition file of the metadata service node to become the master control node, the control nodes are configured to provide an update request to the namespace node, the update request provided by each control node comprises an updated content of the condition file of the metadata service node and an original content of a condition file recorded by the control node;
    wherein the namespace node is configured to:
        compare the original content of the condition file recorded by the control node with a content of the condition file on the namespace node;
        for a target update request carrying the original content the same as the content of the condition file on the namespace node, update the content of the condition file on the namespace node to the updated content carried by the target update request to obtain a target condition file; and
        return an update success message to the control node providing the target update request; and
    wherein the control nodes are configured to determine the control node receiving the update success message as the master control node.

4. The system of claim 2, wherein when utilizing the operation on the data to control the condition file on the metadata node to be the same as the condition file on the namespace node, the master control node is configured to provide a first operation request to the namespace node, the first operation request comprising a first content of the condition file recorded by the master control node;
    wherein the namespace node is configured to:
        compare the first content with a second content of the condition file on the namespace node;
        in response to the first content and the second content being the same, return an identifier of data to be operated on for the first operation request and version information of the condition file on the namespace node to the master control node;
    wherein the master control node is configured to:
        generate a second operation request based on the first content, the identifier of the data to be operated on, and the version information of the condition file of the namespace node; and
        provide the second operation request to the metadata node; and
    wherein the metadata node is configured to update the content of the condition file of the metadata node to the first content in response to the version information of the condition file of the namespace node being later than the version information of the condition file of the metadata node.

5. A method for metadata management, applicable to a master control node, comprising:
    acquiring an operation permission on data in a distributed file system by competing with other control nodes for a permission to update condition files configured in distributed metadata service nodes, wherein the condition files are files configured to provide an operating condition for the control nodes to operate data in the distributed file system; and
    controlling, by an operation on the data, the condition files of the distributed metadata service nodes to be updated to be consistent with each other.

6. The method of claim 5, wherein controlling, by the operation on the data, the condition files of the distributed metadata service nodes to be updated to be consistent with each other comprises:
    controlling, by the operation on the data, condition files on a metadata node and a namespace node in the distributed metadata service nodes to be updated to the same condition file.

7. The method of claim 6, wherein controlling, by the operation on the data, the condition files on the metadata node and the namespace node in the distributed metadata service nodes to be the same comprises:
    providing a first operation request to the namespace node, the first operation request comprising a first content of the condition file recorded by the master control node, for the namespace node to return an identifier of data to be operated on for the first operation request and version information of the condition file on the namespace node in response to the first content being the same as a second content of the condition file on the namespace node;

generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

8. The method of claim 5, wherein the method is further applicable to distributed metadata service nodes, and the method further comprises:

acquiring an operation request for data in a distributed file system provided by a master control node; and updating, in response to the operation request, condition files of the distributed metadata service nodes to be consistent with each other.

9. The method of claim 8, wherein updating, in response to the operation request, the condition files of the distributed metadata service nodes to be consistent with each other comprises:

updating, by a metadata node and a namespace node in the distributed metadata service nodes, in response to the operation request, condition files on the metadata node and the namespace node in the distributed metadata service nodes to the same condition file.

10. The method of claim 9, wherein updating, by the metadata node and the namespace node in the distributed metadata service nodes, in response to the operation request, the condition files on the metadata node and the namespace node in the distributed metadata service nodes to the same condition file comprises:

receiving, by the metadata node, a first operation request provided by the master control node, the first operation request comprising a first content of the condition file recorded by the master control node;

comparing, by the namespace node, the first content with a second content of the condition file on the namespace node;

in response to the first content and the second content being the same, returning, by the namespace node, an identifier of data to be operated on for the first operation request and version information of the condition file on the namespace node to the master control node;

receiving, by the metadata node, a second operation request generated by the master control node based on the first content, the identifier of the data to be operated on, and the version information of the condition file of the namespace node; and in response to the version information of the condition file of the namespace node being later than the version information of the condition file of the metadata node, updating, by the metadata node, the content of the condition file of the metadata node to the first content.

11. The method of claim 9, further comprising:

receiving, by the namespace node, a first condition file deletion request sent by the master control node;

in response to the first condition file deletion request, determining, by the namespace node, a target metadata node configured with a condition file to be deleted;

sending, by the namespace node, a second condition file deletion request to the target metadata node;

in response to the second condition file deletion request, deleting, by the target metadata node, the condition file to be deleted;

returning, by the target metadata node, a deletion success message to the namespace node; and in response to the deletion success message, deleting, by the namespace node, the condition file to be deleted.

12. The method of claim 11, wherein sending, by the namespace node, the second condition file deletion request to the target metadata node comprises:

in response to the first condition file deletion request, timing, by the namespace node, a delay duration; and in response to the delay duration reaching a set duration, sending, by the namespace node, a second condition file deletion request to the target metadata node.

13. The method of claim 9, further comprising:

periodically querying, by the metadata node, the condition file of the namespace node according to a set query cycle; and in response to a condition file found in the metadata node being non-existent in the namespace node, deleting, by the metadata node, the condition file being non-existent in the namespace node from the metadata node.

14. A computing device, comprising:

a memory for storing a computer program;

a communication component; and one or more processors coupled to the memory and the communication component and configured to execute the computer program to perform operations comprising:

acquiring an operation permission on data in a distributed file system by competing with other control nodes for a permission to update condition files configured in distributed metadata service nodes, wherein the condition files are files configured to provide an operating condition for the control nodes to operate data in the distributed file system; and controlling, by an operation on the data, the condition files of the distributed metadata service nodes to be updated to be consistent with each other.

15. The computing device of claim 14, wherein controlling, by the operation on the data, the condition files of the distributed metadata service nodes to be updated to be consistent with each other comprises:

controlling, by the operation on the data, condition files on a metadata node and a namespace node in the distributed metadata service nodes to be updated to the same condition file.

16. The computing device of claim 15, wherein controlling, by the operation on the data, the condition files on the metadata node and the namespace node in the distributed metadata service nodes to be the same comprises:

providing a first operation request to the namespace node, the first operation request comprising a first content of the condition file recorded by a master control node, for the namespace node to return an identifier of data to be operated on for the first operation request and version information of the condition file on the namespace node in response to the first content being the same as a second content of the condition file on the namespace node;

generating a second operation request based on the first content, the identifier of the data to be operated on, and the version information of the condition file of the namespace node; and providing the second operation request to the metadata node, for the metadata node to update the content of the condition file of the metadata node to the first content in response to the version information of the condition file of the namespace node being later than version information of the condition file of the metadata node.

17. The computing device of claim 14, wherein the operations further comprise:
   acquiring an operation request for data in a distributed file system provided by a master control node; and
   updating, in response to the operation request, condition files of distributed metadata service nodes to be consistent with each other.

18. The computing device of claim 17, wherein updating, in response to the operation request, the condition files of the distributed metadata service nodes to be consistent with each other comprises:
   updating, by a metadata node and a namespace node in the distributed metadata service nodes, in response to the operation request, condition files on the metadata node and the namespace node in the distributed metadata service nodes to the same condition file.

19. The computing device of claim 18, wherein updating, by the metadata node and the namespace node in the distributed metadata service nodes, in response to the operation request, the condition files on the metadata node and the namespace node in the distributed metadata service nodes to the same condition file comprises:
   receiving, by the metadata node, a first operation request provided by the master control node, the first operation request comprising a first content of the condition file recorded by the master control node;
   comparing, by the namespace node, the first content with a second content of the condition file on the namespace node;
   in response to the first content and the second content being the same, returning, by the namespace node, an identifier of data to be operated on for the first operation request and version information of the condition file on the namespace node to the master control node;
   receiving, by the metadata node, a second operation request generated by the master control node based on the first content, the identifier of the data to be operated on, and the version information of the condition file of the namespace node; and
   in response to the version information of the condition file of the namespace node being later than the version information of the condition file of the metadata node, updating, by the metadata node, the content of the condition file of the metadata node to the first content.

20. The computing device of claim 18, wherein the operations further comprise:
   receiving, by the namespace node, a first condition file deletion request sent by the master control node;
   in response to the first condition file deletion request, determining, by the namespace node, a target metadata node configured with a condition file to be deleted;
   sending, by the namespace node, a second condition file deletion request to the target metadata node;
   in response to the second condition file deletion request, deleting, by the target metadata node, the condition file to be deleted;
   returning, by the target metadata node, a deletion success message to the namespace node; and
   in response to the deletion success message, deleting, by the namespace node, the condition file to be deleted.

* * * * *